(12) United States Patent
Wang et al.

(10) Patent No.: US 10,531,226 B1
(45) Date of Patent: Jan. 7, 2020

(54) DETERMINING QUALIFIED DEVICES USING ZONE INFORMATION

(71) Applicant: WeWork Companies Inc., New York, NY (US)

(72) Inventors: Dexin Wang, Belmont, CA (US); Patrick B. Philips, Portland, OR (US); Michael A. Minar, Palo Alto, CA (US)

(73) Assignee: WeWork Companies Inc., New York, NY (US)

( * ) Notice: Subject to any disclaimer, the term of this patent is extended or adjusted under 35 U.S.C. 154(b) by 0 days.

(21) Appl. No.: 15/130,870

(22) Filed: Apr. 15, 2016

Related U.S. Application Data

(60) Provisional application No. 62/249,934, filed on Nov. 2, 2015, provisional application No. 62/191,270, filed on Jul. 10, 2015, provisional application No. 62/206,226, filed on Aug. 17, 2015, provisional application No. 62/222,046, filed on Sep. 22, 2015.

(51) Int. Cl.
| | | |
|---|---|---|
| *G06Q 30/02* | (2012.01) | |
| *H04W 4/02* | (2018.01) | |
| *H04W 8/18* | (2009.01) | |
| *H04L 29/08* | (2006.01) | |

(52) U.S. Cl.
CPC ........ *H04W 4/023* (2013.01); *G06Q 30/0201* (2013.01); *H04W 8/18* (2013.01); *H04L 67/12* (2013.01); *H04L 67/22* (2013.01)

(58) Field of Classification Search
CPC ..... G06Q 30/0201; G06Q 50/16; H04W 4/04; H04W 4/027; H04W 4/005; H04W 4/023; H04W 8/18; H04L 63/1425; H04L 63/0245; H04L 63/0227; H04L 63/1416; H04L 43/04; H04L 43/00; H04L 43/062; H04L 43/065; H04L 41/069; H04L 43/028; H04L 67/12; H04L 67/22; G06F 21/55

See application file for complete search history.

(56) References Cited

U.S. PATENT DOCUMENTS

| | | | |
|---|---|---|---|
| 7,038,584 B2 | 5/2006 | Carter | |
| 7,925,613 B2 | 4/2011 | Fujimoto et al. | |
| 2012/0191534 A1 | 7/2012 | Tavares et al. | |
| 2013/0044914 A1* | 2/2013 | Rai | G06K 9/3216 |
| | | | 382/103 |
| 2013/0303184 A1* | 11/2013 | Yang | G01S 5/0263 |
| | | | 455/456.1 |

(Continued)

OTHER PUBLICATIONS

Bahl et al., "RADAR: an in-building RF-based user location and tracking system," Proceedings IEEE INFOCOM 2000. Conference on Computer Communications. Nineteenth Annual Joint Conference of the IEEE Computer and Communications Societies (Cat. No. 00CH37064), Tel Aviv, pp. 775-784 vol. 2. 2000.

(Continued)

*Primary Examiner* — Khawar Iqbal
(74) *Attorney, Agent, or Firm* — Perkins Coie LLP

(57) ABSTRACT

Determining qualified devices using zone information is disclosed. Traffic data associated with the presence of a set of devices at a location is received. At least some of the devices included in the set are qualified as qualified devices. A set of sessions associated with at least some of the qualified devices is crated. Information associated with the set of sessions is provided as output.

17 Claims, 39 Drawing Sheets

(56) References Cited

U.S. PATENT DOCUMENTS

| | | | |
|---|---|---|---|
| 2014/0100916 A1* | 4/2014 | Li | G06Q 30/02 |
| | | | 705/7.31 |
| 2015/0025936 A1 | 1/2015 | Garel et al. | |
| 2016/0006753 A1* | 1/2016 | McDaid | H04L 63/1425 |
| | | | 726/23 |
| 2016/0078484 A1* | 3/2016 | Emigh | G06Q 30/0211 |
| | | | 705/14.58 |
| 2016/0117688 A1* | 4/2016 | Ghosh | G06Q 30/0201 |
| | | | 705/7.29 |
| 2016/0286349 A1* | 9/2016 | Borghei | H04W 4/021 |
| 2016/0335649 A1* | 11/2016 | Ghosh | G06F 16/29 |
| 2016/0337397 A1* | 11/2016 | Li | H04L 63/1458 |
| 2016/0350776 A1 | 12/2016 | High et al. | |
| 2016/0371662 A1* | 12/2016 | Fine | G06Q 20/102 |
| 2017/0223501 A1* | 8/2017 | Kim | H04W 4/023 |
| 2017/0293950 A1* | 10/2017 | Rathod | G06Q 30/02 |
| 2018/0069770 A1* | 3/2018 | Mihelich | H04L 63/0421 |
| 2019/0140795 A1* | 5/2019 | Olsson | H04L 5/0051 |

OTHER PUBLICATIONS

Farid et al., "Recent Advances in Wireless Indoor Localization Techniques and System," Journal of Computer Networks and Communications, vol. 2013, Article ID 185138, 12 pages, 2013.

Yang et al., "Tagoram: real-time tracking of mobile RFID tags to high precision using COTS devices", In Proceedings of the 20th annual international conference on Mobile computing and networking (MobiCom '14). ACM, New York, NY, USA, 237-248. 2014.

Yin et al., "Adaptive Temporal Radio Maps for Indoor Location Estimation," Third IEEE International Conference on Pervasive Computing and Communications, Kauai Island, HI, pp. 85-94, 2005.

* cited by examiner

|  | hotel | retail | airport |
|---|---|---|---|
| inside signal cutoff | -88 | -75 | -80 |
| too long duration | 1080 min | 360 min | 480 min |
| obs within open hours to be visitor | 95% | 80% | 100% |
| too short duration | 30 minutes | 2 minutes | 30 min |
| staff like (sessions over 3 hours in last 10 days) | 5 | 3 | 3 |

FIG. 3

| d4_metrics_tall_zoning | | | | | | | | |
|---|---|---|---|---|---|---|---|---|
| client_name | hierarchy_node_id | period | period_earliest | birth | metric | value | confidence_interval_low | confidence_interval_high | sample_size |
| ACME | ACME_charing_cross | hour | 10/3/2015 0:00 | 10/5/2015 16:44 | visit-duration | 15.5512 | 13.9474 | 16.8182 | 19 |
| ACME | ACME_charing_cross | hour | 10/3/2015 0:00 | 10/5/2015 16:45 | visit-duration-quartile | 1 | 0 | 1 | 3947 |
| ACME | ACME_charing_cross | hour | 10/3/2015 0:00 | 10/5/2015 16:44 | visits | 19 | 16 | 25 | 19 |
| ACME | ACME_charing_cross | hour | 10/3/2015 0:00 | 10/5/2015 16:45 | visits-quartile | 1 | 1 | 2 | 3948 |
| ACME | ACME_charing_cross:Betjeman Suite | hour | 10/3/2015 0:00 | 10/5/2015 16:44 | visit-duration | 18 | 18 | 18 | 1.66667 |
| ACME | ACME_charing_cross:Betjeman Suite | hour | 10/3/2015 0:00 | 10/5/2015 16:45 | visit-duration-quartile | 3 | 3 | 3 | 3123 |
| ACME | ACME_charing_cross:Betjeman Suite | hour | 10/3/2015 0:00 | 10/5/2015 16:44 | visits | 2.5 | 2 | 3 | 2.5 |
| ACME | ACME_charing_cross:Betjeman Suite | hour | 10/3/2015 0:00 | 10/5/2015 16:45 | visits-quartile | 1 | 0 | 1 | 3132 |
| ACME | ACME_charing_cross:Lobby | hour | 10/3/2015 0:00 | 10/5/2015 16:44 | visit-duration | 10 | 10 | 10 | 1.25 |
| ACME | ACME_charing_cross:Lobby | hour | 10/3/2015 0:00 | 10/5/2015 16:45 | visit-duration-quartile | 2 | 2 | 2 | 2782 |
| ACME | ACME_charing_cross:Lobby | hour | 10/3/2015 0:00 | 10/5/2015 16:44 | visits | 1.66667 | 1 | 2 | 1.66667 |
| ACME | ACME_charing_cross:Lobby | hour | 10/3/2015 0:00 | 10/5/2015 16:45 | visits-quartile | 0 | 0 | 0 | 2792 |
| ACME | ACME_charing_cross:Meetings and Events | hour | 10/3/2015 0:00 | 10/5/2015 16:44 | visit-duration | 18.5417 | 18 | 19 | 2.5 |
| ACME | ACME_charing_cross:Meetings and Events | hour | 10/3/2015 0:00 | 10/5/2015 16:45 | visit-duration-quartile | 3 | 3 | 3 | 3187 |
| ACME | ACME_charing_cross:Meetings and Events | hour | 10/3/2015 0:00 | 10/5/2015 16:44 | visits | 2 | 1 | 3 | 2 |
| ACME | ACME_charing_cross:Meetings and Events | hour | 10/3/2015 0:00 | 10/5/2015 16:45 | visits-quartile | 0 | 0 | 1 | 3196 |
| ACME | ACME_charing_cross:Residential | hour | 10/3/2015 0:00 | 10/5/2015 16:44 | visit-duration | 9.58214 | 8.66667 | 10.3333 | 11 |
| ACME | ACME_charing_cross:Residential | hour | 10/3/2015 0:00 | 10/5/2015 16:45 | visit-duration-quartile | 0 | 0 | 0 | 3938 |
| ACME | ACME_charing_cross:Residential | hour | 10/3/2015 0:00 | 10/5/2015 16:44 | visits | 11 | 8 | 15 | 11 |
| ACME | ACME_charing_cross:Residential | hour | 10/3/2015 0:00 | 10/5/2015 16:45 | visits-quartile | 2 | 1 | 2 | 3938 |
| ACME | ACME_charing_cross:Restaurant and Bar | hour | 10/3/2015 0:00 | 10/5/2015 16:44 | visit-duration | 14.66 | 9.8 | 20.75 | 8 |
| ACME | ACME_charing_cross:Restaurant and Bar | hour | 10/3/2015 0:00 | 10/5/2015 16:45 | visit-duration-quartile | 2 | 0 | 3 | 3678 |
| ACME | ACME_charing_cross:Restaurant and Bar | hour | 10/3/2015 0:00 | 10/5/2015 16:44 | visits | 8 | 2 | 13 | 8 |
| ACME | ACME_charing_cross:Restaurant and Bar | hour | 10/3/2015 0:00 | 10/5/2015 16:45 | visits-quartile | 1 | 0 | 2 | 3685 |

FIG. 4A

| hierarchy_node_id | duration_bucket | period | period_earliest | birth | metric | value | confidence_interval_low | confidence_interval_high | sample_size |
|---|---|---|---|---|---|---|---|---|---|
| ACME_charing_cross | 0-10 | day | 10/3/2015 0:00 | 10/5/2015 16:43 | durations | 0.414035 | 0.414035 | 0.414035 | 570 |
| ACME_charing_cross | 11-20 | day | 10/3/2015 0:00 | 10/5/2015 16:43 | durations | 0.335088 | 0.335088 | 0.335088 | 570 |
| ACME_charing_cross | 21-30 | day | 10/3/2015 0:00 | 10/5/2015 16:43 | durations | 0.180702 | 0.180702 | 0.180702 | 570 |
| ACME_charing_cross | 31-40 | day | 10/3/2015 0:00 | 10/5/2015 16:43 | durations | 0.0385965 | 0.0385965 | 0.0385965 | 570 |
| ACME_charing_cross | 41+ | day | 10/3/2015 0:00 | 10/5/2015 16:43 | durations | 0.0315789 | 0.0315789 | 0.0315789 | 570 |
| ACME_charing_cross::Betjeman Suite | 0-10 | day | 10/3/2015 0:00 | 10/5/2015 16:43 | durations | 0.526316 | 0.526316 | 0.526316 | 76 |
| ACME_charing_cross::Betjeman Suite | 11-20 | day | 10/3/2015 0:00 | 10/5/2015 16:43 | durations | 0.276316 | 0.276316 | 0.276316 | 76 |
| ACME_charing_cross::Betjeman Suite | 21-30 | day | 10/3/2015 0:00 | 10/5/2015 16:43 | durations | 0.144737 | 0.144737 | 0.144737 | 76 |
| ACME_charing_cross::Betjeman Suite | 31-40 | day | 10/3/2015 0:00 | 10/5/2015 16:43 | durations | 0.0394737 | 0.0394737 | 0.0394737 | 76 |
| ACME_charing_cross::Betjeman Suite | 41+ | day | 10/3/2015 0:00 | 10/5/2015 16:43 | durations | 0.0131579 | 0.0131579 | 0.0131579 | 76 |
| ACME_charing_cross::Lobby | 0-10 | day | 10/3/2015 0:00 | 10/5/2015 16:43 | durations | 0.620253 | 0.620253 | 0.620253 | 79 |
| ACME_charing_cross::Lobby | 11-20 | day | 10/3/2015 0:00 | 10/5/2015 16:43 | durations | 0.240506 | 0.240506 | 0.240506 | 79 |
| ACME_charing_cross::Lobby | 21-30 | day | 10/3/2015 0:00 | 10/5/2015 16:43 | durations | 0.0886076 | 0.0886076 | 0.0886076 | 79 |
| ACME_charing_cross::Lobby | 31-40 | day | 10/3/2015 0:00 | 10/5/2015 16:43 | durations | 0.0253165 | 0.0253165 | 0.0253165 | 79 |
| ACME_charing_cross::Lobby | 41+ | day | 10/3/2015 0:00 | 10/5/2015 16:43 | durations | 0.0253165 | 0.0253165 | 0.0253165 | 79 |
| ACME_charing_cross::Meetings and Events | 0-10 | day | 10/3/2015 0:00 | 10/5/2015 16:43 | durations | 0.676768 | 0.676768 | 0.676768 | 99 |
| ACME_charing_cross::Meetings and Events | 11-20 | day | 10/3/2015 0:00 | 10/5/2015 16:43 | durations | 0.232323 | 0.232323 | 0.232323 | 99 |
| ACME_charing_cross::Meetings and Events | 21-30 | day | 10/3/2015 0:00 | 10/5/2015 16:43 | durations | 0.0606061 | 0.0606061 | 0.0606061 | 99 |
| ACME_charing_cross::Meetings and Events | 31-40 | day | 10/3/2015 0:00 | 10/5/2015 16:43 | durations | 0.020202 | 0.020202 | 0.020202 | 99 |
| ACME_charing_cross::Meetings and Events | 41+ | day | 10/3/2015 0:00 | 10/5/2015 16:43 | durations | 0.010101 | 0.010101 | 0.010101 | 99 |
| ACME_charing_cross::Residential | 0-10 | day | 10/3/2015 0:00 | 10/5/2015 16:43 | durations | 0.506122 | 0.506122 | 0.506122 | 245 |
| ACME_charing_cross::Residential | 11-20 | day | 10/3/2015 0:00 | 10/5/2015 16:43 | durations | 0.24898 | 0.24898 | 0.24898 | 245 |
| ACME_charing_cross::Residential | 21-30 | day | 10/3/2015 0:00 | 10/5/2015 16:43 | durations | 0.191837 | 0.191837 | 0.191837 | 245 |
| ACME_charing_cross::Residential | 31-40 | day | 10/3/2015 0:00 | 10/5/2015 16:43 | durations | 0.0285714 | 0.0285714 | 0.0285714 | 245 |
| ACME_charing_cross::Residential | 41+ | day | 10/3/2015 0:00 | 10/5/2015 16:43 | durations | 0.0244898 | 0.0244898 | 0.0244898 | 245 |
| ACME_charing_cross::Restaurant and Bar | 0-10 | day | 10/3/2015 0:00 | 10/5/2015 16:43 | durations | 0.588 | 0.588 | 0.588 | 250 |
| ACME_charing_cross::Restaurant and Bar | 11-20 | day | 10/3/2015 0:00 | 10/5/2015 16:43 | durations | 0.26 | 0.26 | 0.26 | 250 |
| ACME_charing_cross::Restaurant and Bar | 21-30 | day | 10/3/2015 0:00 | 10/5/2015 16:43 | durations | 0.108 | 0.108 | 0.108 | 250 |
| ACME_charing_cross::Restaurant and Bar | 31-40 | day | 10/3/2015 0:00 | 10/5/2015 16:43 | durations | 0.02 | 0.02 | 0.02 | 250 |
| ACME_charing_cross::Restaurant and Bar | 41+ | day | 10/3/2015 0:00 | 10/5/2015 16:43 | durations | 0.024 | 0.024 | 0.024 | 250 |

FIG. 4B

| d4_conditional_metrics | | | | | | | | | |
|---|---|---|---|---|---|---|---|---|---|
| client_name | hierarchy_node_id | compare_node | period | period_earliest | birth | metric | value | confidence_interval_low | confidence_interval_high | sample_size |
| ACME | ACME_charing_cross | ACME_charing_cross | day | 10/3/2015 0:00 | | 10/5/2015 16:43 cooccurrence | 1 | 1 | 1 | 570 |
| ACME | ACME_charing_cross | ACME_charing_cross:Betjeman Suite | day | 10/3/2015 0:00 | | 10/5/2015 16:43 cooccurrence | 0.133333 | 0.133333 | 0.133333 | 570 |
| ACME | ACME_charing_cross | ACME_charing_cross:Lobby | day | 10/3/2015 0:00 | | 10/5/2015 16:43 cooccurrence | 0.138596 | 0.138596 | 0.138596 | 570 |
| ACME | ACME_charing_cross | ACME_charing_cross:Meetings and Events | day | 10/3/2015 0:00 | | 10/5/2015 16:43 cooccurrence | 0.173684 | 0.173684 | 0.173684 | 570 |
| ACME | ACME_charing_cross | ACME_charing_cross:Residential | day | 10/3/2015 0:00 | | 10/5/2015 16:43 cooccurrence | 0.429825 | 0.429825 | 0.429825 | 570 |
| ACME | ACME_charing_cross | ACME_charing_cross:Restaurant and Bar | day | 10/3/2015 0:00 | | 10/5/2015 16:43 cooccurrence | 0.438596 | 0.438596 | 0.438596 | 570 |
| ACME | ACME_charing_cross:Betjeman Suite | ACME_charing_cross | day | 10/3/2015 0:00 | | 10/5/2015 16:43 cooccurrence | 1 | 1 | 1 | 76 |
| ACME | ACME_charing_cross:Betjeman Suite | ACME_charing_cross:Betjeman Suite | day | 10/3/2015 0:00 | | 10/5/2015 16:43 cooccurrence | 1 | 1 | 1 | 76 |
| ACME | ACME_charing_cross:Betjeman Suite | ACME_charing_cross:Lobby | day | 10/3/2015 0:00 | | 10/5/2015 16:43 cooccurrence | 0.144737 | 0.144737 | 0.144737 | 76 |
| ACME | ACME_charing_cross:Betjeman Suite | ACME_charing_cross:Meetings and Events | day | 10/3/2015 0:00 | | 10/5/2015 16:43 cooccurrence | 0.0526316 | 0.0526316 | 0.0526316 | 76 |
| ACME | ACME_charing_cross:Betjeman Suite | ACME_charing_cross:Restaurant and Bar | day | 10/3/2015 0:00 | | 10/5/2015 16:43 cooccurrence | 0.276316 | 0.276316 | 0.276316 | 76 |
| ACME | ACME_charing_cross:Betjeman Suite | ACME_charing_cross:Restaurant and Bar | day | 10/3/2015 0:00 | | 10/5/2015 16:43 cooccurrence | 0.184211 | 0.184211 | 0.184211 | 76 |
| ACME | ACME_charing_cross:Lobby | ACME_charing_cross | day | 10/3/2015 0:00 | | 10/5/2015 16:43 cooccurrence | 1 | 1 | 1 | 79 |
| ACME | ACME_charing_cross:Lobby | ACME_charing_cross:Betjeman Suite | day | 10/3/2015 0:00 | | 10/5/2015 16:43 cooccurrence | 0.139241 | 0.139241 | 0.139241 | 79 |
| ACME | ACME_charing_cross:Lobby | ACME_charing_cross:Lobby | day | 10/3/2015 0:00 | | 10/5/2015 16:43 cooccurrence | 1 | 1 | 1 | 79 |
| ACME | ACME_charing_cross:Lobby | ACME_charing_cross:Meetings and Events | day | 10/3/2015 0:00 | | 10/5/2015 16:43 cooccurrence | 0.113924 | 0.113924 | 0.113924 | 79 |
| ACME | ACME_charing_cross:Lobby | ACME_charing_cross:Residential | day | 10/3/2015 0:00 | | 10/5/2015 16:43 cooccurrence | 0.164557 | 0.164557 | 0.164557 | 79 |
| ACME | ACME_charing_cross:Lobby | ACME_charing_cross:Restaurant and Bar | day | 10/3/2015 0:00 | | 10/5/2015 16:43 cooccurrence | 0.21519 | 0.21519 | 0.21519 | 79 |
| ACME | ACME_charing_cross:Meetings and Events | ACME_charing_cross | day | 10/3/2015 0:00 | | 10/5/2015 16:43 cooccurrence | 1 | 1 | 1 | 99 |
| ACME | ACME_charing_cross:Meetings and Events | ACME_charing_cross:Betjeman Suite | day | 10/3/2015 0:00 | | 10/5/2015 16:43 cooccurrence | 0.040404 | 0.040404 | 0.040404 | 99 |
| ACME | ACME_charing_cross:Meetings and Events | ACME_charing_cross:Lobby | day | 10/3/2015 0:00 | | 10/5/2015 16:43 cooccurrence | 0.0909091 | 0.0909091 | 0.0909091 | 99 |
| ACME | ACME_charing_cross:Meetings and Events | ACME_charing_cross:Meetings and Events | day | 10/3/2015 0:00 | | 10/5/2015 16:43 cooccurrence | 1 | 1 | 1 | 99 |
| ACME | ACME_charing_cross:Meetings and Events | ACME_charing_cross:Residential | day | 10/3/2015 0:00 | | 10/5/2015 16:43 cooccurrence | 0.212121 | 0.212121 | 0.212121 | 99 |
| ACME | ACME_charing_cross:Meetings and Events | ACME_charing_cross:Restaurant and Bar | day | 10/3/2015 0:00 | | 10/5/2015 16:43 cooccurrence | 0.50505 | 0.50505 | 0.50505 | 99 |
| ACME | ACME_charing_cross:Residential | ACME_charing_cross | day | 10/3/2015 0:00 | | 10/5/2015 16:43 cooccurrence | 1 | 1 | 1 | 245 |
| ACME | ACME_charing_cross:Residential | ACME_charing_cross:Betjeman Suite | day | 10/3/2015 0:00 | | 10/5/2015 16:43 cooccurrence | 0.0857143 | 0.0857143 | 0.0857143 | 245 |
| ACME | ACME_charing_cross:Residential | ACME_charing_cross:Lobby | day | 10/3/2015 0:00 | | 10/5/2015 16:43 cooccurrence | 0.0530612 | 0.0530612 | 0.0530612 | 245 |
| ACME | ACME_charing_cross:Residential | ACME_charing_cross:Meetings and Events | day | 10/3/2015 0:00 | | 10/5/2015 16:43 cooccurrence | 0.0857143 | 0.0857143 | 0.0857143 | 245 |
| ACME | ACME_charing_cross:Residential | ACME_charing_cross:Residential | day | 10/3/2015 0:00 | | 10/5/2015 16:43 cooccurrence | 1 | 1 | 1 | 245 |
| ACME | ACME_charing_cross:Residential | ACME_charing_cross:Restaurant and Bar | day | 10/3/2015 0:00 | | 10/5/2015 16:43 cooccurrence | 0.171429 | 0.171429 | 0.171429 | 245 |
| ACME | ACME_charing_cross:Restaurant and Bar | ACME_charing_cross | day | 10/3/2015 0:00 | | 10/5/2015 16:43 cooccurrence | 1 | 1 | 1 | 250 |
| ACME | ACME_charing_cross:Restaurant and Bar | ACME_charing_cross:Betjeman Suite | day | 10/3/2015 0:00 | | 10/5/2015 16:43 cooccurrence | 0.056 | 0.056 | 0.056 | 250 |
| ACME | ACME_charing_cross:Restaurant and Bar | ACME_charing_cross:Lobby | day | 10/3/2015 0:00 | | 10/5/2015 16:43 cooccurrence | 0.068 | 0.068 | 0.068 | 250 |
| ACME | ACME_charing_cross:Restaurant and Bar | ACME_charing_cross:Meetings and Events | day | 10/3/2015 0:00 | | 10/5/2015 16:43 cooccurrence | 0.2 | 0.2 | 0.2 | 250 |
| ACME | ACME_charing_cross:Restaurant and Bar | ACME_charing_cross:Residential | day | 10/3/2015 0:00 | | 10/5/2015 16:43 cooccurrence | 0.168 | 0.168 | 0.168 | 250 |

FIG. 4C

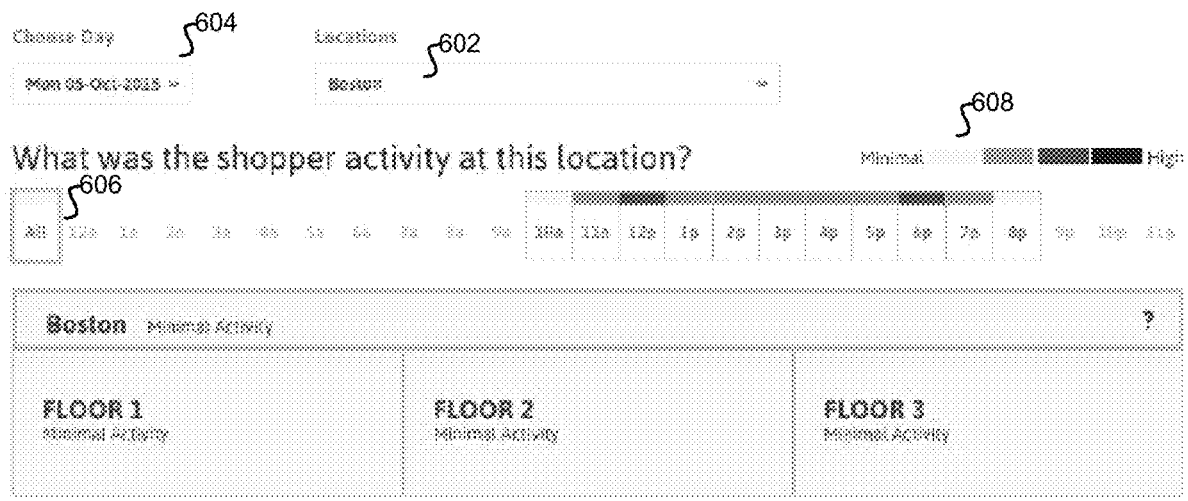
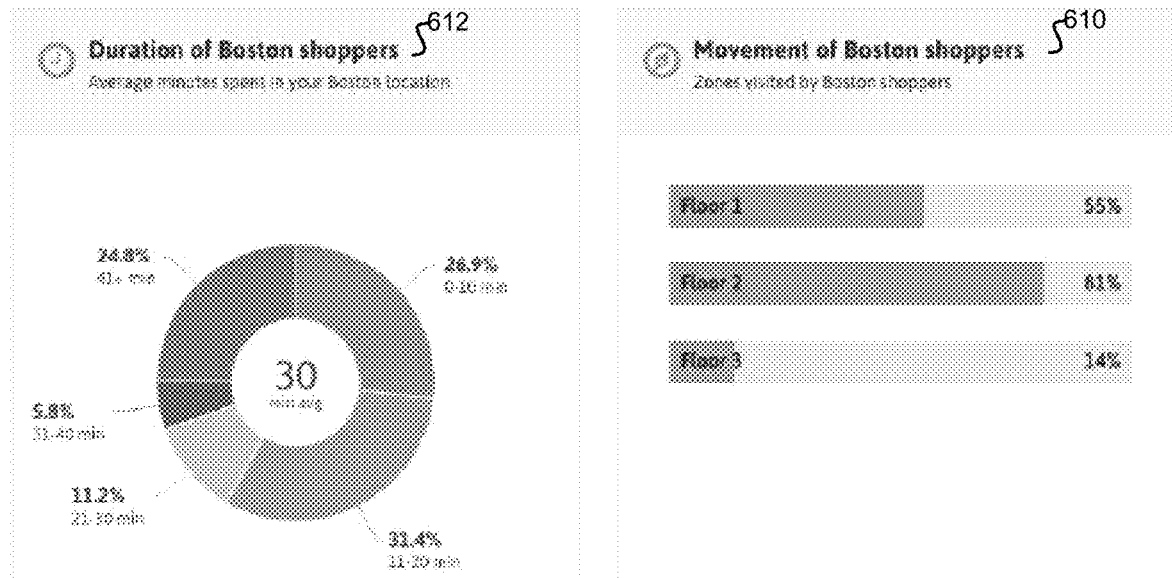
FIG. 6

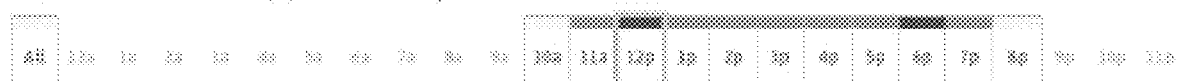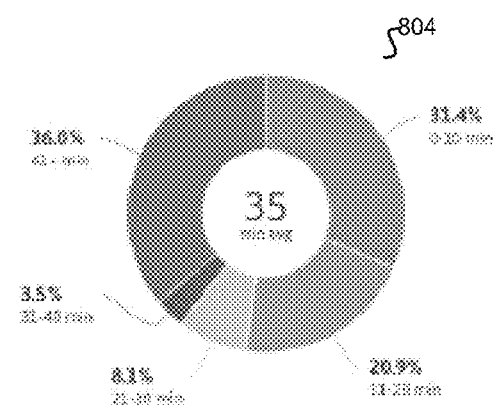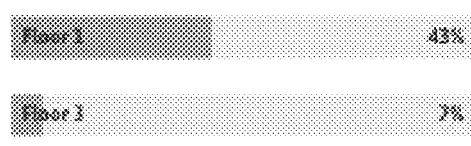
FIG. 8

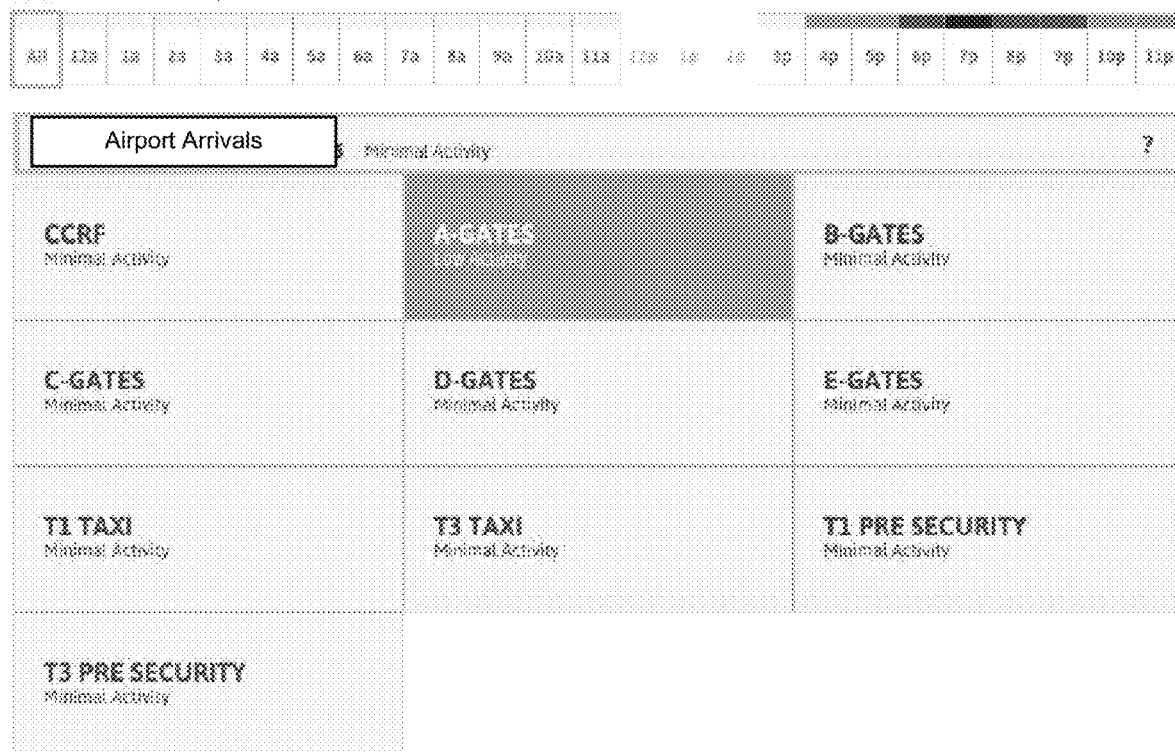
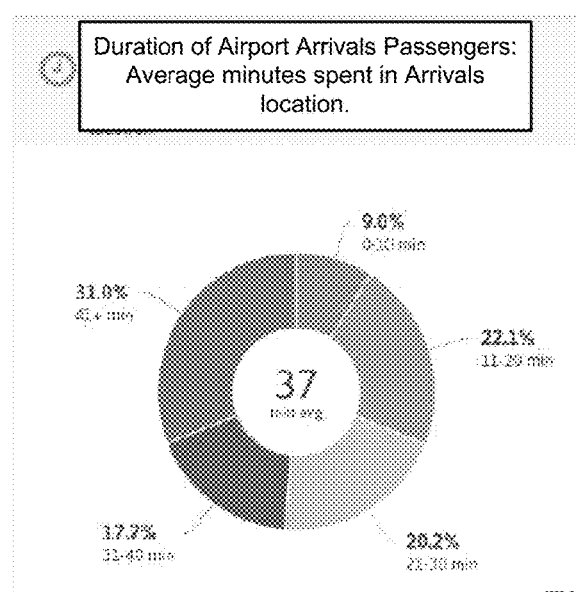
FIG. 9

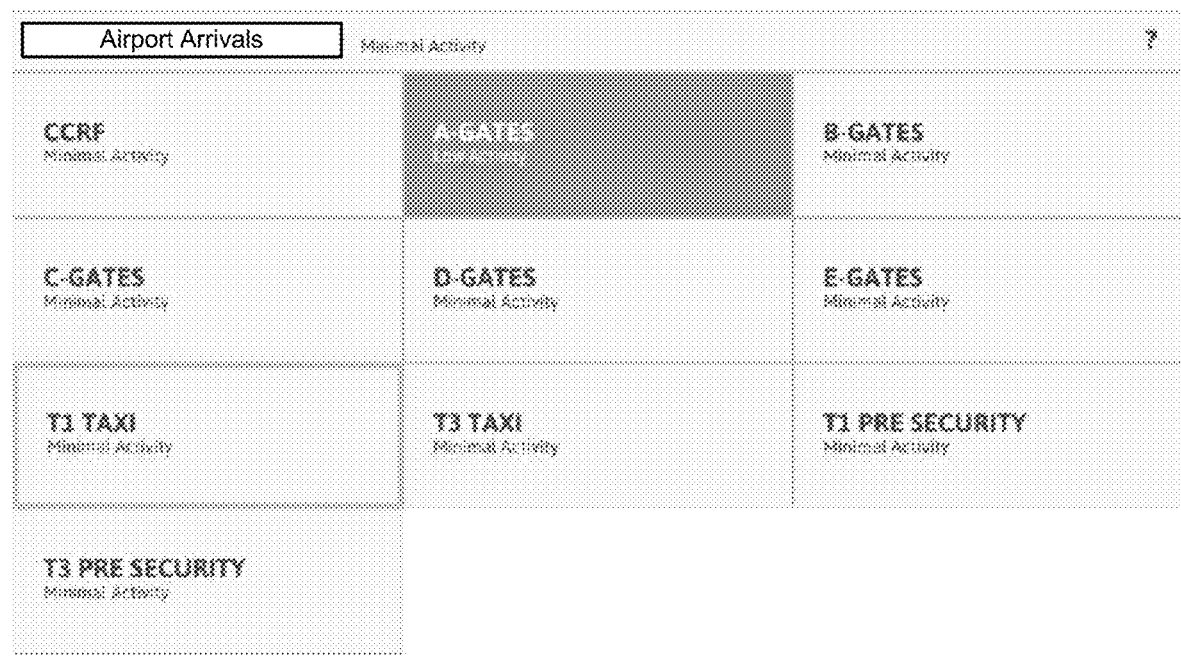
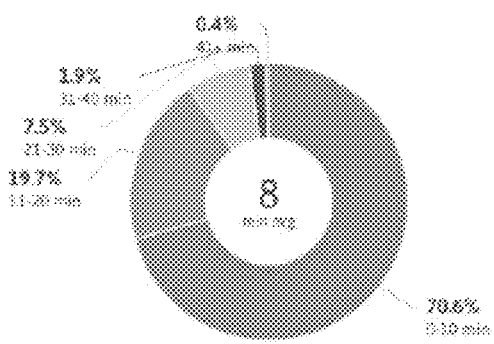
FIG. 13

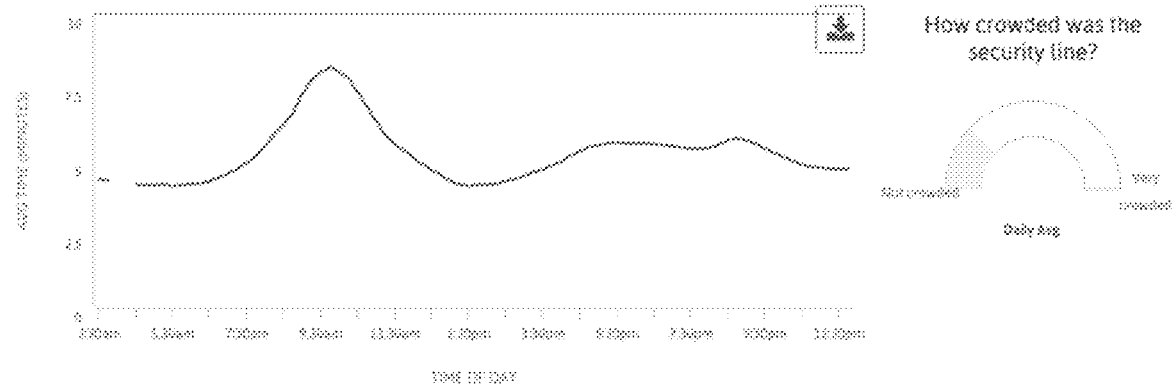
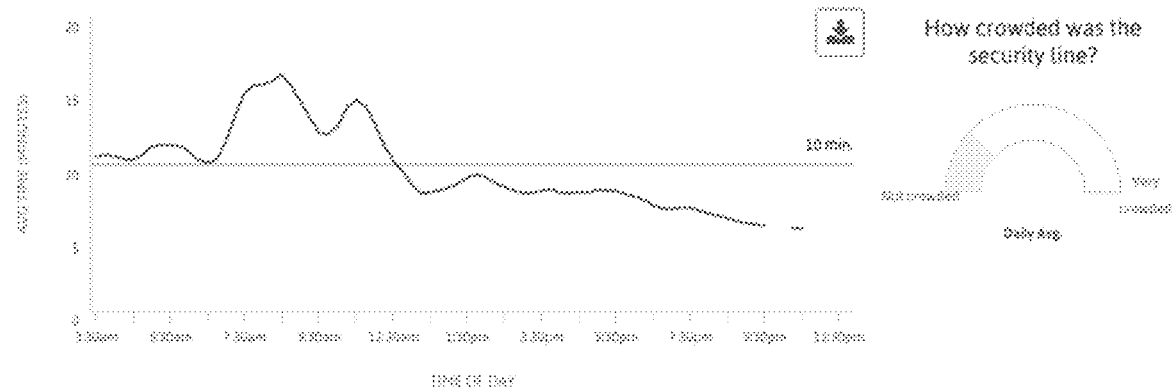
FIG. 14B

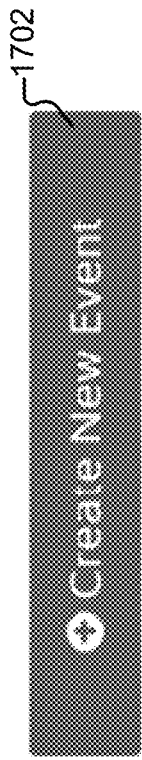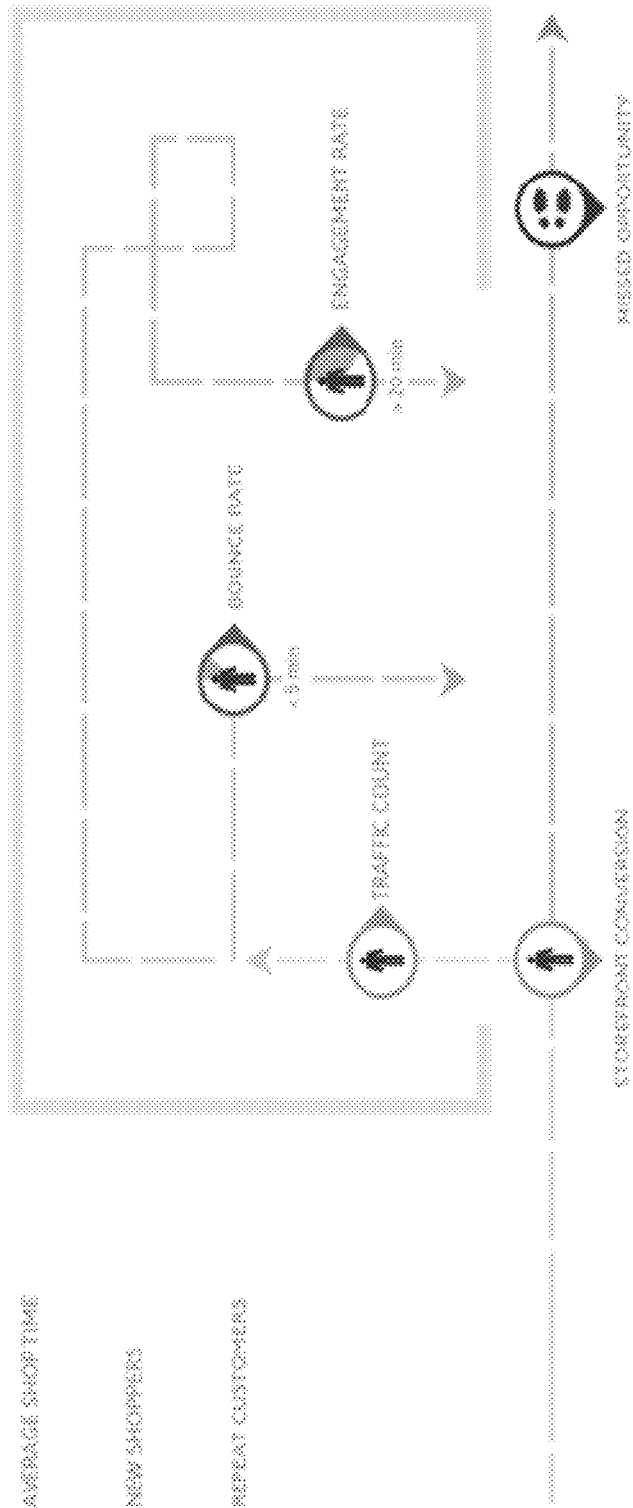
FIG. 17

FIG. 20

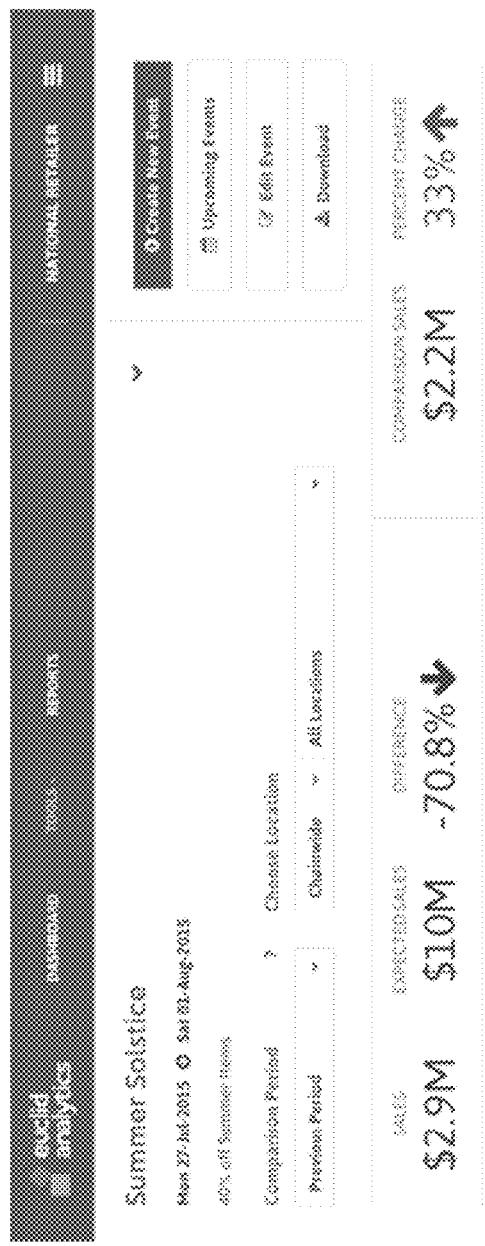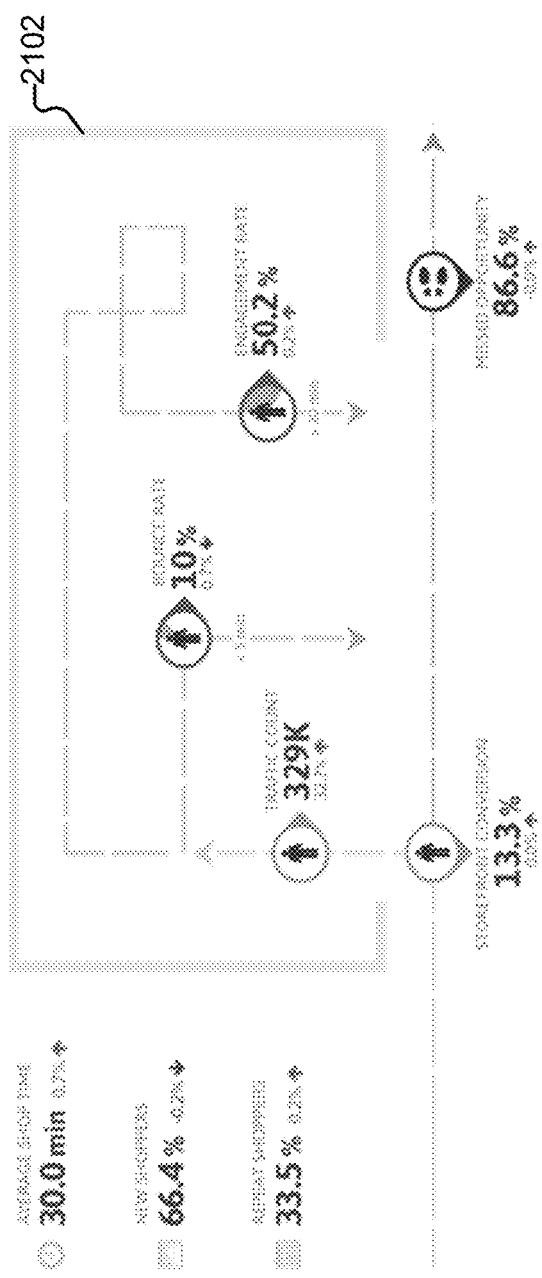
FIG. 21

DETERMINING QUALIFIED DEVICES USING ZONE INFORMATION

CROSS REFERENCE TO OTHER APPLICATIONS

This application claims priority to U.S. Provisional Patent Application No. 62/249,934 entitled DETERMINING QUALIFIED DEVICES USING ZONE INFORMATION filed Nov. 2, 2015 which is incorporated herein by reference for all purposes.

This application claims priority to U.S. Provisional Patent Application No. 62/191,270 entitled SALES AND TRAFFIC DATA ANALYSIS filed Jul. 10, 2015 which is incorporated herein by reference for all purposes.

This application claims priority to U.S. Provisional Patent Application No. 62/206,226 entitled SENSOR NETWORK HIERARCHIES filed Aug. 17, 2015 which is incorporated herein by reference for all purposes.

This application claims priority to U.S. Provisional Patent Application No. 62/222,046 entitled SENSOR NETWORK HIERARCHIES filed Sep. 22, 2015 which is incorporated herein by reference for all purposes.

BACKGROUND OF THE INVENTION

Technology is increasingly being used to track individuals as they visit retail shops and other locations. As one example, door counting devices can be used by a retail store to track the number of visitors to a particular store (e.g., entering through a particular door or set of doors) each day. As another example, in-store cameras can be used to monitor the movements of visitors (e.g., observing whether they turn right or left after entering the store). A variety of drawbacks to using such technologies exist. One drawback is cost: monitoring technology can be expensive to install, maintain, and/or run. A second drawback is that such technology is limited in the insight it can provide. For example, door counts do not distinguish between employees (who might enter and leave the building repeatedly during the course of the day) and shoppers. A third drawback is that such technology can be overly invasive. For example, shoppers may object to being constantly surveilled by cameras—particularly when the cameras are used for reasons other than providing security (e.g., assessing reactions to marketing displays).

BRIEF DESCRIPTION OF THE DRAWINGS

Various embodiments of the invention are disclosed in the following detailed description and the accompanying drawings.

FIG. 3 illustrates a variety of example zoning rules and settings.

FIG. 4A illustrates an example of a zoning metric table.

FIG. 4B illustrates an example of a zoning metric table.

FIG. 4C illustrates an example of a zoning metric table.

FIGS. 6-8 show interfaces depicting zoning information for a national retailer at a particular location in Boston.

FIGS. 9-15 show interfaces depicting zoning information for an airport.

FIGS. 17-20 show examples of interfaces for creating an event.

FIGS. 21-22 show examples of event summary page interfaces.

FIG. 27-30 depict an example implementation of an events pipeline wrapper script.

FIG. 31 depicts sample data from an event frequency table.

DETAILED DESCRIPTION

Figure 1A:
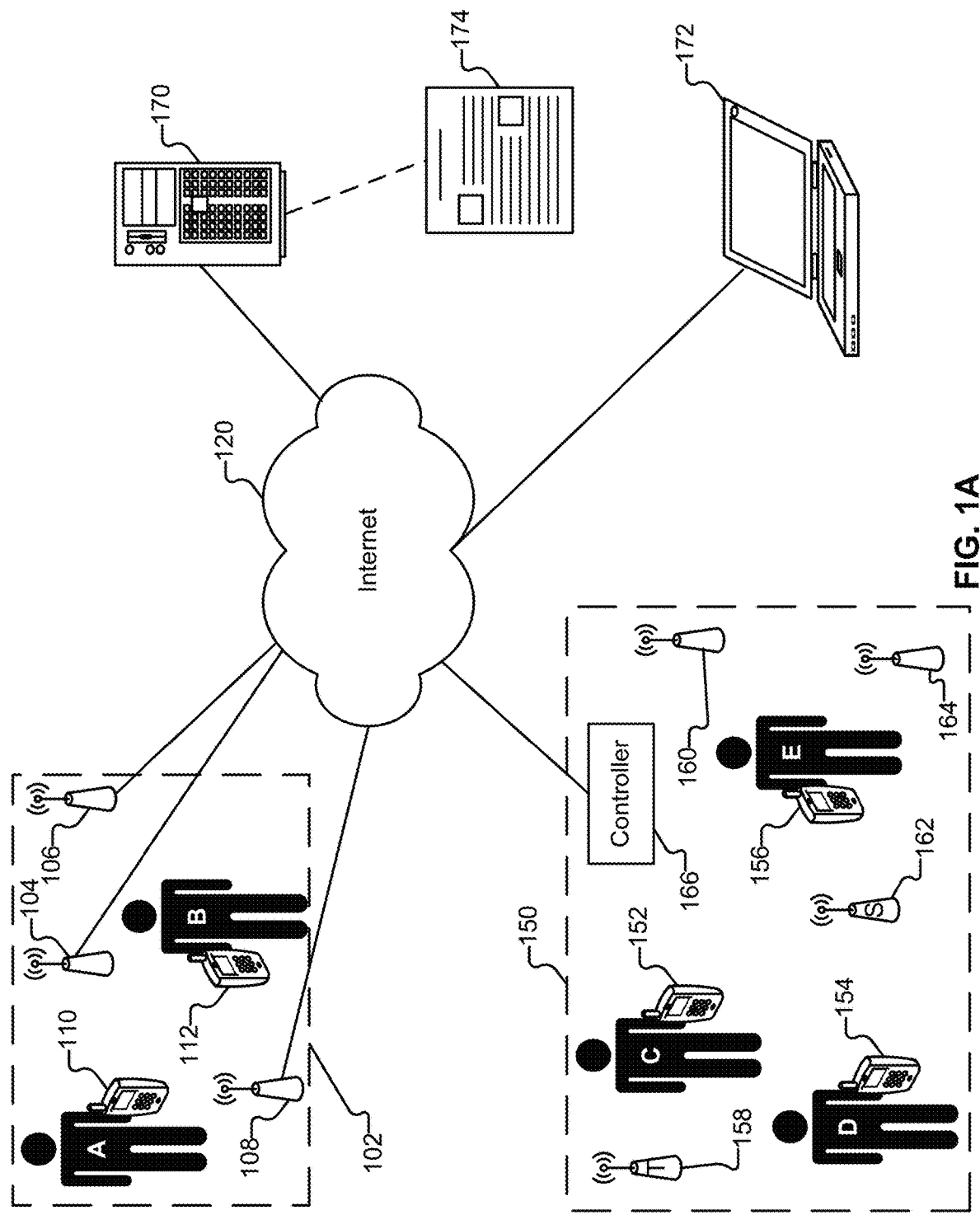
FIG. 1A illustrates an example of an environment in which sensors collect data from mobile electronic devices and the collected data is processed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Individuals increasingly carry mobile electronic devices (e.g., mobile phones, laptops, tablets, etc.) virtually all of the time as they go about their daily lives. Using techniques described herein, a variety of sensors can be used to detect the presence of such devices (e.g., devices with WiFi, cellular, and/or Bluetooth capabilities) based on the capabilities of the sensors. And, insights about the individuals carrying those devices can be gained.

Throughout the Specification, the primary example of a "sensor" is a WiFi access point, and the primary example of a mobile electronic device is a cellular phone with WiFi enabled (though not necessarily associated with the "observing" WiFi access point). It is to be understood that the techniques described herein can be used in conjunction with a variety of kinds of sensors/devices, and the techniques described herein adapted as applicable. For example, in addition to WiFi access points, Radio Frequency (RF) receivers that detect RF signals produced by cellular phones, and Bluetooth receivers that detect signals produced by Bluetooth capable devices can be used in accordance with techniques described herein. Further, a single device can have multiple kinds of signals detected and used in accordance with techniques described herein. For example, a cellular phone may be substantially simultaneously detected by one or more sensors through a WiFi connection, a cellular connection, and/or a Bluetooth connection, and/or other wireless technology present on a commodity cellular phone. Data collected by the sensors can be used in a variety of ways, and a variety of insights can be gained (e.g., about the individuals carrying the devices). As will be described in more detail below, the data can be collected in efficient and privacy preserving ways.

FIG. 1A illustrates an example of an environment in which sensors collect data from mobile electronic devices and the collected data is processed. In the example shown, Alice and Bob are present in a retail space 102. In particular, Alice and Bob are both shoppers shopping at a brick-and-mortar clothing store (hereinafter "ACME Clothing"). Included in retail space 102 are a set of sensors (104-108). Sensors 104-108 are WiFi access points (e.g., offering WiFi service to customers and/or providing service to point-of-sales and other store infrastructure). Sensors 104-108 each detect wireless signals from mobile electronic devices. In the example shown in FIG. 1A, Alice and Bob each carry a mobile device (e.g., cellular phones 110 and 112, respectively).

Also included in the environment shown in FIG. 1A is an airport space 150. Charlie and Dave are passengers in airport space 150, and Eve is an employee at a bookstand. Charlie, Dave, and Eve each carry respective mobile devices 152-156. Sensors, including sensors 158-164 are present in airport space 150.

The sensors depicted in FIG. 1A (i.e., sensors 104-108 and 158-164) are commodity WiFi access points. Other sensors can also be used in conjunction with techniques described herein as applicable. As will be described in more detail below, the sensors included in spaces 102 and 150 can be grouped into zones (an arbitrary collection of sensors). For example, suppose retail space 102 is a two story building, with sensors 108 and 110 on the first floor, and sensor 106 on the second floor. Sensors 108 and 110 can be grouped into a "First Floor" zone, and Sensor 106 can be the sole sensor placed in a "Second Floor" zone.

Floors are one example of zoning, and tend to work well in retail environments (e.g., due to WiFi resolution of approximately 10 meters). Other segmentations can also be used for zoning (including in retail environments), depending on factors such as wall placement, as applicable. As another example, airport space 150 might have several zones, corresponding to areas such as "Ticketing," "A Gates," "B Gates," "Pre-Security Shops," "A Gate Security," "Taxis," etc. Further, the zones can be arranged in a hierarchy. Using airport space 150 as an example, two hierarchical zones could be: Airport-Terminal 1-A Gates and Airport-Terminal 2-Pre-Security Shops.

Figure 1B:
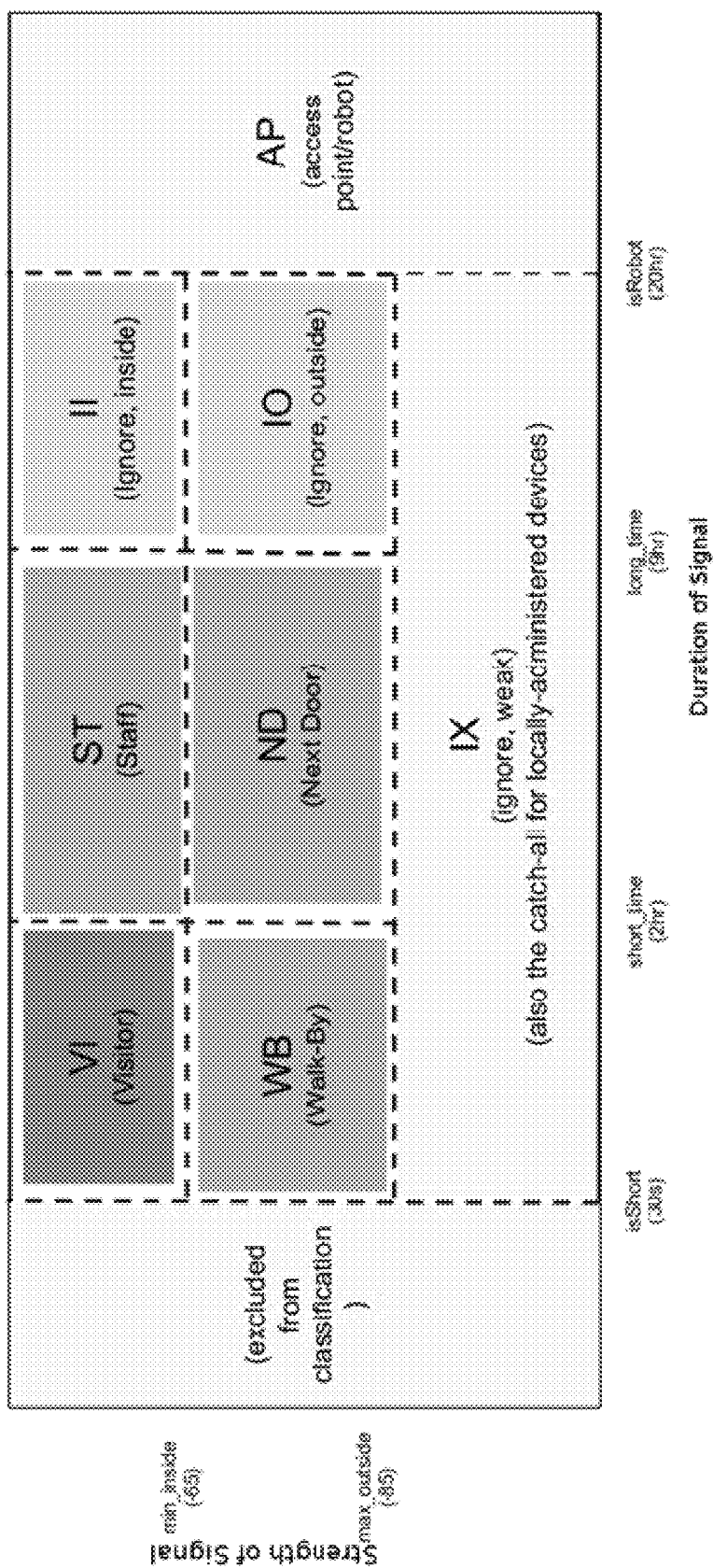
FIG. 1B depicts a graphical representation of example strengths and durations and how classifications can be made.

As will be described in more detail below, signal strength and signal duration can be used to classify devices observed by a sensor. FIG. 1B depicts a graphical representation of example strengths and durations and how classifications can be made. Signal strength can be used as an indicator of whether an observed device is within the geographic confines of a sensor's zone. In some embodiments, if the device is determined to be within the geographic boundaries of the sensor's zone, it is classified as a visitor. If the signal is weak enough that it is determined to be outside the boundaries of the sensor's zone, it is determined to be a walk-by. If a zone has more than one sensor, multiple sensor readings can be used to determine if a device is a visitor or a walk-by. Certain devices can also be determined to be access points or other devices that do not belong to visitors or walk-bys, as illustrated in FIG. 1B. By measuring the length of time that the device is seen, for example, a determination can be made (e.g., probabilistically) whether a device belongs to staff, happens to be an access point inside the zone, and/or is otherwise a device type that should be ignored (e.g., a printer or point-of-sales terminal).

Onboarding

In the following discussion, suppose a representative of ACME Clothing would like to gain insight about shopper traffic in the store. Examples of information ACME Clothing would like to learn include how many shoppers visit the second floor of the store in a given day, how much total time shoppers spend in the store, and how much time they spend on the respective floors of the store. Using techniques described herein, ACME Clothing can leverage commodity WiFi access points to learn the answers to those and other questions. In particular, in various embodiments, ACME Clothing can leverage the access points that it previously installed (e.g., to provide WiFi to shoppers and/or staff/sales infrastructure) without having to purchase new hardware.

In various embodiments, ACME Clothing begins using the services of traffic insight platform 170 as follows. First, a representative of ACME Clothing (e.g., via computer 172) creates an account on platform 170 on behalf of ACME Clothing (e.g., via a web interface 174 to platform 170). ACME Clothing is assigned an identifier on platform 170 and a variety of tables (described in more detail below) are initialized on behalf of ACME Clothing.

A first table (e.g., a MySQL table), referred to herein as an "asset table," stores information about ACME Clothing and its sensors. The asset table can be stored in a variety of resources made available by platform 170, such as relational database system (RDS) 242. To populate the table, the ACME representative (hereinafter referred to as Rachel) is prompted to provide information about the access points present in space 102, such as their Media Access Control (MAC) addresses, and, as applicable, vendor/model number information. Rachel is also asked to optionally provide grouping information (e.g., as applicable, to indicate that sensors 108 and 110 are in a "First Floor" group and 112 is in a "Second Floor group). The access point information can be provided in a variety of ways. As one example, Rachel can be asked to complete a web form soliciting such information (e.g., served by interface 174). Rachel can also be asked to upload a spreadsheet or other file/data structure to platform 170 that includes the required information. The spreadsheet (or portions thereof) can be created by Rachel (or another representative of ACME Clothing) or, as applicable, can also be created by networking hardware or other third party tools. Additional (optional) information can also be included in the asset table (or otherwise associated with ACME Clothing's account). For example, a street address of the store location, city/state information for the location, time-zone information for the location, and/or latitude/longitude information can be included, along with end-user-friendly descriptions (e.g., providing more information about the zones, such as that the "Zone 1" portion of ACME includes shoes and accessories, and that "Zone 2" includes outerwear).

The zoning hierarchy framework is flexible and can easily be modified by Rachel, as needed. For example, after an initial set up ACME Clothing's zones, Rachel can split a given zone into pieces, or combine zones together (reassigning sensors to the revised zones as applicable, adding new sensors, etc.). The asset table on platform 170 will be updated in response to Rachel's modifications.

In some embodiments, Rachel is asked to provide MAC addresses (or other identifiers) of known non-visitor devices. For example, Rachel can provide the identifiers of various computing equipment present in space 102 (e.g., printers, copiers, point of sales terminals, etc.) to ensure that they are not inadvertently treated by platform 170 as belonging to visitors. As another example, Rachel can provide the identifiers of staff-owned mobile computing devices (and designate them as belonging to staff, and/or designate them as to be ignored, as applicable). As will be described in more detail below, Rachel need not supply such MAC addresses, and platform 170 can programmatically identify devices that are probabilistically unlikely to belong to visitors and exclude them from analysis as applicable.

In the example of FIG. 1A, ACME Clothing is a single location business. Techniques describes herein can also be used in conjunction with multi-location businesses. In such a scenario, additional hierarchical information can be provided during onboarding. As one example, a retail store with 50 locations could organize its access points into geographical or other regions (e.g., with West Coast—California—Store 123—First Floor—AA:12:34:56:78:FF and West Coast—Nevada—Store 456—Second Floor—BB:12:34:56:67:FF being two examples of information supplied to platform 170 about two sensors). In some cases, a parent company may own stores of multiple brands. For example, Beta Holding Company may own both "Beta Electronics Retail" and "Delta Electronics Depot." The assets table for Beta Holding Company can accordingly include the respective brand names in the hierarchy of access points if desired (e.g., "Beta Holding Company—Beta Electronics Retail—California—Store 567 . . . " and "Beta Holding Company—Delta Electronics Depot—Texas—Store 121 . . . ").

Ingesting Sensor Data

Rachel is provided (e.g., via interface 174) with instructions for configuring sensors 104-108 to provide platform 170 with data that they collect. Typically, the collected data will include the MAC addresses and signal strength indicators of mobile devices observed by the sensors, as well as applicable timestamps (e.g., time/duration of detection), and the MAC address of the sensor that observed the mobile device. For some integrations, the information is sent in JSON using an existing Application Programming Interface (API) (e.g., by directing the hardware to send reporting data to a particular reporting URL, such as http://ingest.euclidmetrics.com/ACMEClothing or hardware vendor tailored URLs, such as http://cisco.ingest.euclidmetrics.com or hp.ingest.euclidmetrics.com, as applicable, where the data is provided in different formats by different hardware vendors). Accordingly, the configuration instructions provided to Rachel may vary based on which particular hardware (e.g., which manufacturer/vendor of commodity access point) is in use in retail space 102. For example, in some cases, the sensors may report data directly to platform 170 (e.g., as occurs with sensors 104-108). In other cases, the sensors may report data to a controller which in turn provides the data to platform 170 (e.g., as occurs with sensors 158-164 reporting to controller 166).

Figure 2:
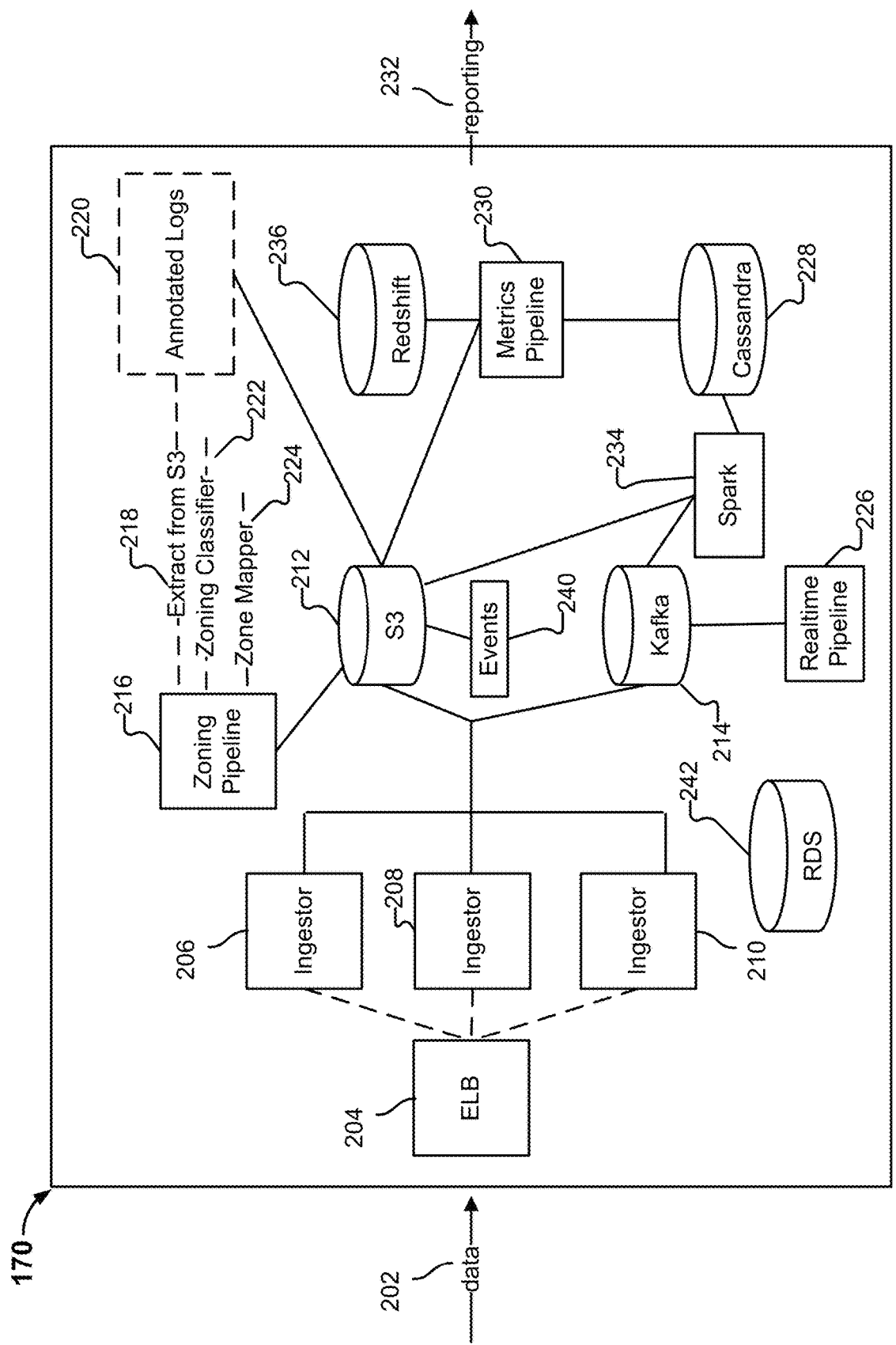
FIG. 2 illustrates an embodiment of a traffic insight platform.

In the example environment shown in FIG. 1A, and in FIG. 2, platform 170 is implemented using cloud computing resources, such as Amazon Web Services (AWS) Google Cloud, or Microsoft's Azure. Resources described herein (or portions thereof) can also be provided by dedicated hardware (e.g., operated by an entity on behalf of itself, such as a governmental entity). Whenever platform 170 is described as performing a task, a single component, a subset of components, or all components of platform 170 may cooperate to perform the task. Similarly, whenever a component of platform 170 is described as performing a task, a sub-component may perform the task and/or the component may perform the task in conjunction with other components. Various logical components and/or features of platform 170 may be omitted and the techniques described herein adapted accordingly. Similarly, additional logical components/features can be added to appliance 170 as applicable.

As shoppers, such as Alice and Bob, walk around in retail space 102, data about the presence of their devices (110 and 112) is observed by sensors (e.g., sensors 104-108) and reported to platform 170. For example, the MAC addresses of devices 110/112, and their observed signal strengths are reported by the observing sensors. The ingestion of that data will now be described, in conjunction with FIG. 2.

FIG. 2 illustrates an embodiment of a traffic insight platform, such as platform 170. Platform 170 receives data 202 (via one or more APIs) into an AWS elastic cloud load balancer (204), which splits the ingestion infrastructure across multiple EC2 instances (e.g., ingestors 206-210). The ingestors create objects out of the received data, which are ultimately written (e.g., as JSON) to disk (e.g., as hourly writes to S3) 212 and a real time messaging bus (e.g., Apache Kafka).

The ingestors are built to handle concurrent data ingestion (e.g., using Scala-based spray and Akka). As mentioned above, data provided by customers such as ACME Clothing typically arrives as JSON, though the formatting of individual payloads may vary between customers of platform 170. As applicable, ingestors 206-210 can rewrite the received data into a canonical format (if the data is not already provided in that format). For example, in various embodiments, ingestors 206-210 include a set of parsers specific to each customer and tailored to the sensor hardwarde manufacturer(s) used by that customer (e.g., Cisco, Meraki, Xirrus, etc.). The parsers parse the data provided by customers and normalize the data in accordance with a canonical format. In various embodiments, additional processing is performed by the ingestors. In particular, the received MAC addresses of mobile devices are hashed (e.g., for privacy reasons) and, in some embodiments, compared against a list of opted-out MAC addresses. Additional transformations can also be performed. For example, in addition to hashing the MAC address, a daily seed can be used (e.g., a daily seed used for all hashing operations for a 24-hour period), so that two different hashes will be generated for the same device if it is seen on two different days. If data is received for a MAC that has opted-out, the data is dropped (e.g., not processed further). One way that users can opt-out of having their data processed by platform 170 is to register the MAC addresses of their mobile devices with platform 170 (e.g., using a web or other interface made available by platform 107 and/or a third party).

As a given ingestor processes the data it has received, it writes to a local text log. Two example log lines written by an ingestor instance (e.g., ingetstor 206) and in JSON are as follows:

Apr. 8, 2015 4:00:00 PM org.apache.jsp.index_jsp_jspService
INFO: {"sn":"40:18:B1:38:7A:40","pf":1,"ht":[{"sl":−89,"ot":1396972150,"s2":46122,"is":667,"sm":"88329B", "so":−89,"sc":−89,"i1":0,"sh":−86,"ct":1396972151,"si":"b533 c82bfeef4232","ih":624,"ap":0,"cn":6,"ss":−526, "cf":5180,"i3":243039545,"s3":−4044994,"i2":391057}], "tp":"ht","sq":846077,"vs":3}

Apr. 8, 2015 4:00:00 PM org.apache.jsp.index_jsp_jspService
INFO: {"sn":"40:18:B1:39:32:C0","pf":1,"ht":[{"sl":−68,"ot":1396972136,"s2":54162,"is":1285,"sm": "68A86D","so":−53,"sc":−61,"i1":20,"sh":−52,"ct": 1396972138,"si":"2e5e1d2807e5d3ad","ih":604,"ap":0, "cn":15,"ss":−898,"cf":2437,"i3":226673720,"s3":−3290416,"i2":420062}],"tp":"ht","sq":830438,"vs":3}

In the above example log lines, "sn" is a serial number (or) MAC of the sensor that observed a mobile device (i.e., that has transmitted the reporting data to platform 107, whether directly or through a controller). The "pf" is an identifier of the customer sending the data. The "ht" is an array of detected devices, and includes the following:

sl: minimum signal strength
ot: timestamp of first frame (unix time in seconds)
s2: sum of the signal strength squared (to calculate variance)
is: sum of intervals (in seconds)
sm: station organizationally unique identifier or manufacturer identifier
so: first signal strength detected
sc: last signal strength detected
i1: minimum interval (in seconds)
sh: maximum signal strength
ct: timestamp of last frame (unix time in seconds)
si: station identifier/detected device identifier, hashed
ih: maximum interval (in seconds)
ap: a flag indicating whether the reporting sensor is an access point or not
cn: count of number of frames summarized in this message for this device
ss: summation of signal strength (a negative number)
cf: frequency last frame received on
i3: sum of interval cubed
s3: sum of signal strength cubed (to calculate skew)
i2: sum of interval squared The "tp" value indicates the type of message (where "ht" is a hit—a device being seen by the sensor, and "hl" is a health message—a ping the sensor sends during periods of inactivity). The "sq" value is a sequence number—a running count of messages from the sensor (and, in some embodiments, resets to zero if the sensor reboots). The "vs" value is a version number for the sensor message.

Once an hour, a script (e.g., executing on ingestor 206) gzips the local ingestor log and pushes it to an S3 bucket. The other ingestors (e.g., ingestor 208 and 210) similarly provide gzipped hourly logs to the S3 bucket, where they will be operated on collectively. The logs stored in S3 are loaded (e.g., by a job executing on the S3 bucket) into MySQL and Redshift, which is in turn used by metrics pipeline 230.

Further, as the ingestors are writing their local logs, threads on each of the ingestors (e.g., Kafka readers) tail the logs and provide the log data to a Kafka bus for realtime analysis (described in more detail below) on an EC2 instance.

Zoning Pipeline

A variety of jobs execute on platform 170. Zoning-related jobs are represented in FIG. 2 as "zoning pipeline" 216. Various portions of the zoning pipeline are written in scripting languages (e.g., as python scripts) or written using S3 tools, etc., as applicable. The zoning pipeline is collectively executed by a cluster of EC2 instances working in parallel (e.g., using a Map Reduce framework) and runs as a batch job (e.g., runs once a day). Other pipelines described herein (e.g., realtime pipeline 226 and metrics pipeline 230) are similarly collections of scripts collectively executed by a cluster of EC2 instances.

Extract from S3

Each day (or another unit of time, as applicable, in alternate embodiments), the following occurs on platform 170. In a first stage, "Extract from S3" (218) the zoning pipeline reads the logs (provided by ingestors 206-210) stored in an S3 bucket the previous day. A "metadata join" script executes, which annotates the log lines with additional (e.g., human friendly) metadata. As one example, during the execution of the metadata join, the MAC address of a reporting sensor (included in the log data) is looked up (e.g., in an asset table) and information such as the human friendly name of the owner of the sensor (e.g., "ACME Clothing"), the human friendly location (e.g., "SF Store" or "Store 123, the hierarchy path (as applicable), etc. are annotated into the log lines. Minute-level aggregation is also performed, using the first seen, last seen, and max signal strength values for a given minute for a given device at a given sensor to collapse multiple lines (if present for a device-sensor combination) into a single line. So, for example, if sensor 108 has made six reports (in a one minute time interval) that it has seen device 122, during minute level aggregation, the six lines reported by sensor 108 are aggregated into a single line, using the strongest maximum signal strength value.

The output of the "Extract from S3" process (annotated log lines, aggregated at the minute level) is written to a new S3 bucket for additional processing. As used hereinafter, the newly written logs (i.e., the output of "Extract from S3") is a daily set of "annotated logs."

Zoning Classification

The next stage of the zoning pipeline makes a probabilistic determination of whether a given mobile electronic device for which data has been received (e.g., by platform 170 from retail space 102) belongs to a shopper (or, in other contexts, such as airport space 150, other kinds of visitors, such as passengers) or represents a device that should (potentially) be excluded from additional processing (e.g., one belonging to a store employee, a point-of-sale terminal, etc.). The filtering determination (e.g., "is visitor" or not) is made using a variety of features/parameters, described in more detail below. The determination is described herein as being made by a "zoning classifier" (222) which is a piece of zoning pipeline 216 (i.e., is implemented using a variety of scripts collectively executing on a cluster of EC2 instances, as with the rest of the zoning pipeline).

During processing of the most recently received daily log data (i.e., the most recently processed annotated logs), zoning classifier 222 groups that daily log data by device MAC. For example, all of Alice's device 110 log entries are grouped together, and all of Bob's device 112 log entries are grouped together. The grouped entries are sorted by timestamp (e.g., with Alice's device 110's first time stamp appearing first, and then its second time stamp appearing next, etc.). In various embodiments, a decision tree of rules is used to filter devices. In some embodiments, at each level, the tree branches, and non-visitor devices are filtered out. One example of a filtering rule is the Boolean, "too short." This Boolean can be appended to any device seen for less than thirty seconds, for example. The "too short" Boolean is indicative of a walk-by—someone who didn't linger long enough to be considered a visitor. A second example of a filtering rule is the Boolean, "too long," which is indicative of a "robot" device (i.e., not a personal device carried by a human). This Boolean can be appended to any device (e.g., a cash machine, printer, point of sale terminal, etc.) that is seen for more than twenty hours in a given day, for example.

More complex filtering rules can also be employed. As one example, suppose Eve (an employee at a bookstand in airport space 150) has a personal cellular phone 156. On a given day (e.g., where Eve works a four hour shift), Eve's device 156 might appear to be similar to a passenger's device (e.g., seen in various locations within the airport over a four hour period of time). However, by examining a moving ten-day window of annotated log data, Eve's device can be filtered from consideration of belonging to a customer. Accordingly, in various embodiments, zoning classifier 222 reads the last ten days (or another appropriate length of time) of annotated logs into RAM, and provides further annotations (e.g., as features) appended to each row of the annotated logs stored in RAM. As one example, a feature of "how many days seen" can be determined by examining the last ten day of annotated log data, and a value (e.g. "2" days or "3" days, etc.) associated with a given device, as applicable, and persisted in memory. Further, if the number of days exceeds a threshold (three days or more), an additional feature "exhibits employee-like behavior" can be associated with Eve's device. Another feature, "seen yesterday" can similarly be determined used to differentiate visitors from employees.

Example rules and settings for a variety of kinds of customers are shown in FIG. 3. Rules (and threshold values, also referred to herein as parameters) can be customized based on customer type/customer needs (e.g., via interface 174), and form a "zoning" model for each location. As one example, one filtering rule that can be used is "seen within hours of operation" (the hours of which will vary based on customer, and can be defined as a parameter, e.g., by an employee like Rachel). Similarly, while a single retail example is shown in FIG. 3, different retail environments can specify different parameters/thresholds for those features as applicable. For example, parameters applicable to a boutique clothing store on Rodeo Drive (with too short=30 seconds or repeat visits in ten days >2 being indicative of an employee device) may be different from those applicable to a grocery store in Topeka (with too short=120 seconds or repeat visitors in ten days >4 being indicative of an employee device). Some features may have binary parameters indicative of whether or not a device is a visitor or not. For example, if a device is flagged as being observed "too long," a zoning model can use that information to conclude that the device is not a visitor. Other features may have varying weights assigned to them, and the determination of whether a device is a visitor or not may be made dependant on the combination of features observed (and the weights assigned). For example, a high number of repeat visits to a coffee shop, while indicative of an employee device, could also plausibly be a loyal customer device. Accordingly, a zoning model for the coffee shop may weight repeat visits as being less probative of whether a device belongs to a customer or not. In various embodiments, platform 170 makes available a variety of default zoning models (e.g.: hotel, indoor shopping mall, outdoor shopping mall, etc.) which can be customized as applicable (e.g., by a user of computer 172 via interface 174).

An example of a device which could survive a filtering decision tree is one that is seen more than 30 seconds, seen fewer than five hours, has a received signal strength indicator (RSSI) of at least 50, and is not seen more than twice in the last ten days. Such a device is probabilistically likely to be a visitor. Devices which are not filtered out are labeled with a Boolean flag of "is visitor" and processing on the data for those devices continues. In various embodiments, the annotated log data for the day being operated on (i.e., for which metrics, described in more detail below, are calculated) is referred to as a "qualified log" once employee/printer/etc. devices have been removed and only those devices probabilistically corresponding to visitors remain. The next stage of classification is to determine "sessions" using the qualified log lines.

As used herein, a "pre-session" is a set of qualified log lines (for a given mobile electronic device) that split on a gap of 30 or minutes. A pre-session is an intermediate output of the zoning classifier. Suppose Alice's device 110 is observed (e.g., by sensor 108) for fifteen minutes, starting at 13:01 on Monday. The annotated log contains fifteen entries for Alice (due to the minute-level aggregation described above). The zoning classifier generates a pre-session for Alice, which groups these fifteen entries together. Suppose Bob's device 112 is observed (e.g., by sensor 108) for two minutes, then is not observed for an hour, and then is seen again for an additional ten minutes on Monday. The zoning classifier will generate two pre-sessions for Bob because there is a one hour gap (i.e., more than 30 minute gap) between times that Bob's device 112 was observed. The first pre-session covers the two minute period, and the second pre-session covers the ten minute period. As yet another example, if Charlie's device 152 is observed for four consecutive hours on a Wednesday, Charlie will have a single pre-session covering the four-hour block of annotated logs pertinent to his device's presence being detected in airport space 150.

In some cases, a pre-session may include data from only a single sensor. As one example, suppose Alice is on the second floor of retail space 102 (which only includes a single access point, sensor 106). Alice's pre-session might accordingly only include observations made by sensor 106. In other cases, a pre-session may include data from multiple sensors. As one example, suppose Charlie (a passenger) arrives at airport space 150, checks in for his flight (in the Ticketing area), purchases a magazine at a pre-security shop, proceeds through security, and then walks to his gate (e.g., gate A15). Charlie is present in airport space 150 for four hours, and his device 152 is observed by several sensors during his time in airport space 150. As mentioned above, Charlie's pre-session is (in this example) four hours long. In some cases, a single sensor may have observed Charlie during a given minute. For example, when Charlie first arrives at airport space 150, his device 152 is observed by a sensor (158) located in the Ticketing area for a few minutes. Once he is checked in, and he walks toward the pre-security shopping area, his device 152 is observed by both the Ticketing area sensor (158) and a sensor (162) located in the pre-security shopping area for a few minutes. Suppose, for example, twenty minutes into Charlie's presence in airport space 150, device 152 is observed by both sensor 158 (strongly) and sensor 162 (weakly). As Charlie gets closer to the stores, the signal strength reported with respect to his device will become weaker with respect to sensor 158 and stronger with respect to sensor 162. In various embodiments, the classifier examines each minute of a pre-session, and, where multiple entries are present (i.e., a given device was observed by multiple sensors), the classifier selects as representative the sensor which reported the strongest signal strength with respect to the device. A variety of values can be used to determine which sensor reported the strongest signal strength for a given interval. As one example, the max signal strength value ("sh") can be used. In various embodiments, this reduction in log data being considered is performed earlier (e.g., during minute level aggregation), or is omitted, as applicable.

Next, a zone mapper 224 (another script or set of scripts operating as part of zoning pipeline 216) annotates each line of each pre-session and appends the zone associated with the observing sensor (or sensor which had the strongest signal strength, as applicable). Returning to the example of Charlie walking around inside airport space 150, the following is a simplified listing of a portion of log data associated with Charlie's device 152. In particular, the simplified data shows a timestamp and an observing sensor:

09:50—AP4
. . .
10:00—AP4
10:01—AP4
10:02—AP2
10:03—AP1
10:04—AP3
10:05—AP2
. . .
10:15—AP2

Suppose AP1, AP2, and AP3 are each sensors present in the "A Gates" section of airport space 150, and AP4 is a sensor present in the security checkpoint area. The zone mapper annotates Charlie's log data as follows:

09:50—AP4—Security
. . .
10:00—AP4—Security
10:01—AP4—Security
10:02—AP2—A-Gates
10:03—AP1—A-Gates
10:04—AP3—A-Gates
10:05—AP2—A-Gates
. . .
10:15—AP2—A-Gates The Zone mapper then collapses contiguous minutes in which the device was seen in the same zone into a single object (referred to herein as a "session"), which can then be stored and/or used for further analysis as described in more detail below. A device level "session," labeled by a zone, is the output of the classification process. In various embodiments, the session object includes all (or portions of) the annotations made by the various stages of the zoning pipeline. In the example of Charlie, the excerpts above indicate that he spent twelve minutes in the security area (from 9:50-10:01) and fourteen minutes in the A-Gates area (10:02-10:15). Two sessions for Charlie will be stored (e.g., in a MySQL database/S3 or other appropriate storage): one corresponding to his twelve minutes in security, and one corresponding to his fourteen minutes in security, along with additional data, as applicable.

Realtime Pipeline

Returning to FIG. 2, as previously mentioned, as ingestors 206-210 write their local logs, threads on each of the ingestors (e.g., Kafka readers) tail the logs and provide the log data to a Kafka bus for realtime analysis on an EC2 instance. As a data source, S3 is inexpensive and reasonably fast. Kafka is more expensive, but significantly faster.

Realtime pipeline 226 operates in a similar manner to zoning pipeline 216 except that it works on a smaller time scale (and thus with less data). For example, instead of operating on ten days of historical data, in various embodiments, the realtime pipeline is configured to examine an hour of historical data. And, where the zoning pipeline executes as a daily batch operation, the realtime pipeline batch operation occurs every five minutes. And, instead of writing results to S3, the realtime pipeline writes to Cassandra (228) tables, which are optimized for parallel reads and writes. The realtime pipeline 226 also accumulates the qualified log data. In some embodiments, a list of banned devices is held in memory, where the devices included on that list are selected based on being seen "too long." Such devices (e.g., noisy devices pinging every two seconds for 20 hours) might be responsible for 60-80% of traffic, and excluding them will make the realtime processing more efficient.

As will be described in more detail below, metrics generated with respect to zoning pipeline data will typically be consumed via reports (e.g., served via interface 174 to an administrator, such as one using computer 172). Metrics generated with respect to realtime pipeline data are, in various embodiments, displayed on television screens (e.g., within airport space 150) or otherwise made publicly available (e.g., published to a website), as indicators of wait times, and refresh frequently (e.g., once a minute). In some embodiments, realtime data can be used to trigger email or other messages. For example, suppose a given checkpoint at a particular time of day typically has a wait time of approximately five minutes (and a total number of five to ten people waiting in line). If the current wait time is twenty minutes and/or there are fifty people in line (e.g., as determined by realtime pipeline 226), platform 170 can output a report (e.g., send an email, an SMS, or other message) to a designated recipient or set of recipients, allowing for the potential remediation of the congestion.

Realtime analysis using the techniques described herein is particularly useful for understanding wait times (e.g., in security, in taxi lines, etc.) and processes such as hotel check-in/check-out. An example use of analysis performed using the zoning techniques described herein is determining how visitors move through a space. For example, historical analysis can be used to determine where to place items/workers/etc. based on flow.

Zoning/Realtime Metrics

Platform 170 includes a metrics pipeline (230) that generates metrics from the output of the zoning pipeline (and/or realtime pipeline as applicable). Various metrics are calculated on a recurring basis (e.g., number of visitors per zone per hour) and stored (e.g., in RedShift store 236). In various embodiments, platform 170 uses a lambda architecture for the metrics pipeline (and other pipelines, as applicable). One example implementation of metrics pipeline 230 is a Spark cluster (running in Apache Mesos). In the case of realtime metrics generation (e.g., updating current security line and/or taxi line wait times), analysis is performed using a Spark Streaming application (234), which stores results in Cassandra (228) for publishing.

Summaries used to generate reports 232 (made available to end users via one or more APIs provided by platform 170) are stored in MySQL. Such stored metrics will include a time period, a zone, and a metric name value. Sample zoning metric tables are shown in FIGS. 4A-4C. In particular, Table 4A holds metrics about visits and durations in the daily/hourly/15-minute level. Table 4B holds a histogram of duration times: within a given time period in a given location, how many visitors were around for 0-10, 11-20, 21-30, 31-40, and more than 41 minutes. Table 4C holds conditional metrics looking at the device level: a pairwise examination of different zones—of the people seen in one zone, what percentage of them were also seen at another zone. Additional metrics can also be determined and are described in more detail below.

Reporting data 232 is made available to representatives of customers of platform 170 (e.g., Rachel) via interface 174. As another example, reporting data 232 is made available to airport space 150 visitors (e.g., via television monitors, mobile applications, and/or website widgets), reflecting information such as current wait times.

For metrics calculated on an hourly basis, any sessions that do not include that time period are ignored during analysis. For example, to determine a visit count at 2 am (i.e., of those visitors present in a location at any time between 2 am and 3 am, in which zones were they located?), only those sessions including a 2 am prefixed timestamp are examined, and a count is made for each represented zone (e.g., two visitors at Ticketing, six visitors at security, etc.).

One example of a metric that can be determined by metrics pipeline 230 is "what is the current average wait time for an individual in line for security at airport space 150?" One way to evaluate the metric is for metrics pipeline 230 to examine results of the most recently completed realtime pipeline job execution (stored in memory) for recently completed sessions where visitors were in the security zone, and determine the average length of the sessions. Metrics for other time periods (e.g., "what was the average wait at 8:00 am") can be determined by taking the list of sessions and re-keying it by a different time period. Additional examples of metrics that can be calculated in this manner (keying on a zone, a time period, and a metric) include "how many visitors were seen each hour in the food court?" and "what was the average amount of time visitors spent in the A-gates on Tuesday?" Percentiles can also be determined using the data of platform. For example, "what was the $75^{th}$ percentile amount of time a visitor spent in the security zone on Tuesday?" or "what was the $99^{th}$ percentile?"

Figure 5:
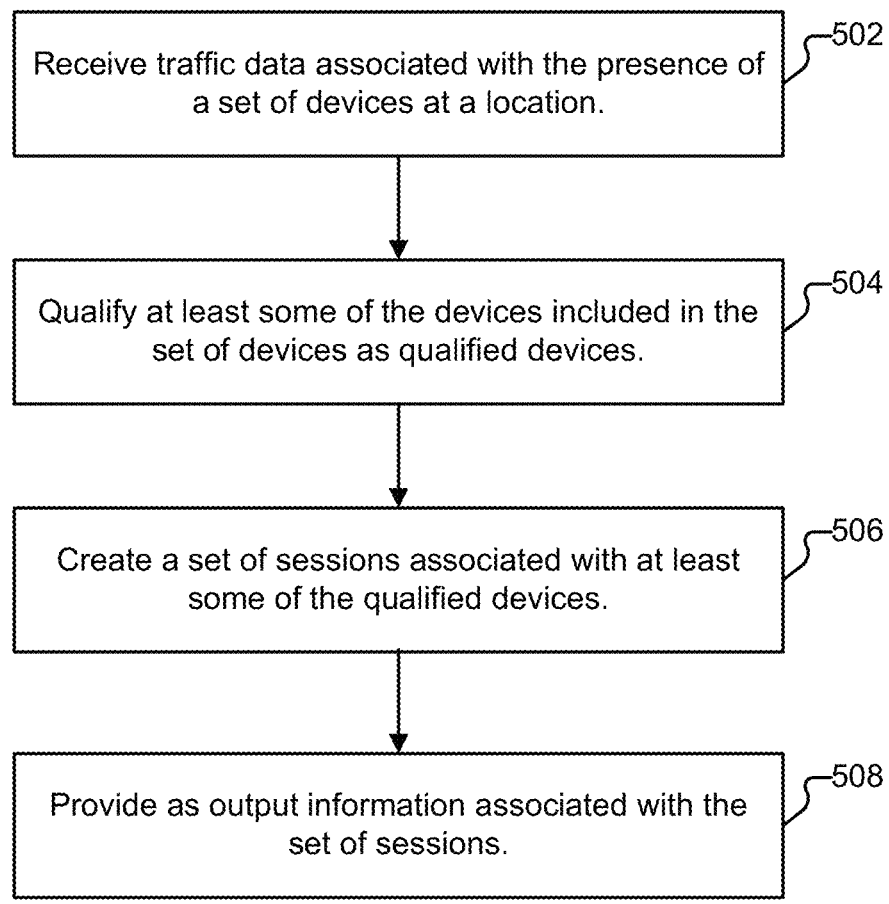
FIG. 5 illustrates an embodiment of a process for determining qualified devices using zone information.

FIG. 5 illustrates an embodiment of a process for determining qualified devices using zone information. In various embodiments, process 500 is performed by platform 170. The process begins at 502 when traffic data associated with the presence of a set of devices at a location is received. As one example, such traffic data is received at 502 when a sensor, such as sensor 108 transmits log data (e.g., indicating that it has observed device 110) to platform 170 via one or more networks (collectively depicted in FIG. 1A as Internet cloud 102), and that data is provided (e.g., by ELB 204) to an ingestor (e.g., ingestor 206). Portion 502 of the process may be repeated several times (e.g., with data about the observation of device 112 also being received at 502, whether from sensor 108, or another sensor, and/or from a controller). At 504, at least some of the devices included in the set of devices are qualified as qualified devices. As one example, at 504 zoning pipeline 216 evaluates data associated with the devices (e.g., by applying a decision tree of rules to log lines associated with the devices and obtained from storage 212). As another example, at 504 realtime pipeline 226 evaluates data associated with the devices (e.g., by comparing the devices against a list of banned devices). In both the cases of zoning pipeline 216 and realtime pipeline 226, at 504, those devices that are not disqualified (i.e., survive the decision tree analysis, are not on the banned list, or otherwise are not disqualified) are designated as qualified devices. At 506, a set of sessions associated with at least some of the qualified devices is created. As one example, at 506, zoning pipeline 216 determines a device-zone-duration 3-tuple for a qualified device using received traffic data or a representation thereof, an example of a session. An example of such a 3-tuple is: device 110, seen from 10:00 to 10:14, in ACME Clothing—First Floor. As another example, at 506, realtime pipeline 226 determines a device-zone-duration 3-tuple for a qualified device using received traffic data or a representation thereof. An example of such a 3-tuple is: device 152, seen from 12:45 to 12:59, in Airport-Terminal 1-A Gates. Finally, at 508, information associated with the set of sessions is provided as output. One example of such output being provided at 508 includes metrics pipeline 230 providing metrics to either/both of Redshift 236 and Cassandra 228 (in conjunction with either the zoning pipeline or realtime pipeline, or both, as applicable). Another example of such output being provided at 508 includes the rendering or other provision of metrics to a user in an interface, such as via interface 174 or a television screen located in airport space 150 (in communication with platform 170). The following section provides additional information regarding a variety of interfaces usable in conjunction with techniques described herein.

Zoning/Realtime Interfaces

FIG. 6 shows an interface depicting zoning information for a national retailer at a particular location in Boston. Interface 600 is an example of data that can be presented to a user (e.g., a customer representative like Rachel) via interface 174. By clicking region 602, the user can select a particular location in the chain. By clicking region 604, the user can choose what time range of data to view (e.g. a particular day). By clicking region 606, the user can choose whether to see the data across an entire day, or by hour. As shown in FIG. 6, the entire days' worth of data is being displayed. As shown in region 608, in order to provide a relative estimate for how busy a particular zone is at a certain time (without counts), a quartile index of Minimal, Low, Medium, High activity is used. Region 610 quantifies the percent of cross visitation within a certain location. When the store as a whole is selected (as is the case in this view) the user sees what percentage of all shoppers visited the different zones within a location. When a certain zone is selected, the chart will show what percentage of shoppers that visited the selected zone also visited a different zone. Region 612 shows the breakdown of duration across all zones within a location. When the user selects a particular zone this chart updates with zone specific information.

Figure 7:
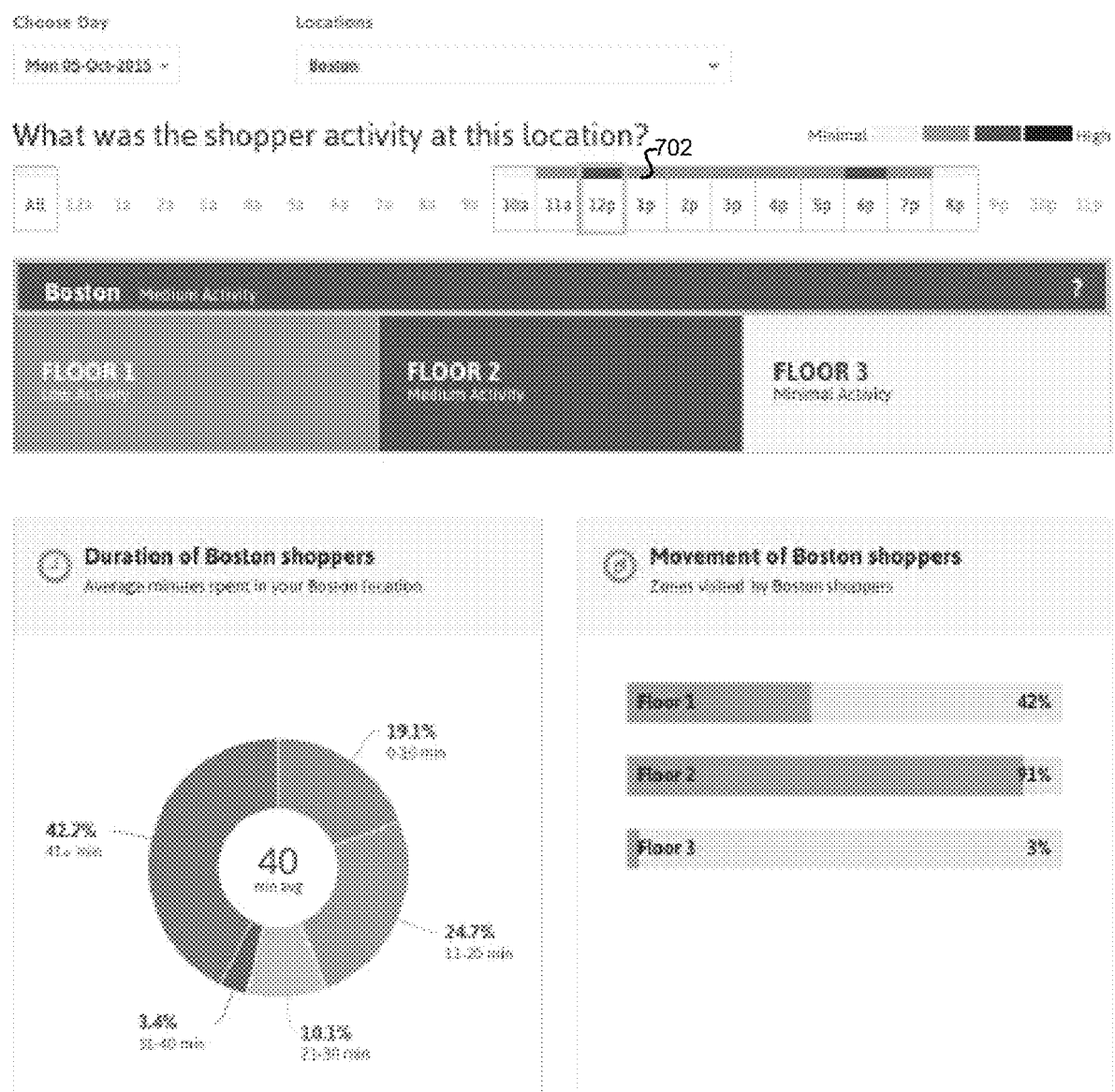

FIG. 7 shows an interface depicting zoning information for a national retailer at a particular location in Boston. When an hour is selected (702), all data below updates.

FIG. 8 shows an interface depicting zoning information for a national retailer at a particular location in Boston. When a zone is selected (802), all data below updates. The level of activity is calculated, in some embodiments, by comparing the amount of traffic in a zone to a historical average (e.g., not relative to other zones). As shown in region 804, a viewer of interface 800 can learn the duration breakdown of the visitors to a particular floor.

Suppose the average visitor to floor one of a store (which offers housewares) stays fifteen minutes, and an additional 25% of visitors to floor one stay between 21 and 30 minutes. Further suppose that of those store visitors that visit the second floor, they stay on the floor a much shorter time on average (e.g., stay an average of six minutes on the second floor). If "big purchase" items (e.g., furniture) are located on the second floor, the comparatively short amount of time spent on the second floor indicates that visitors are not buying furniture.

As another example, a representative of a grocery store could use a set of interfaces similar to those shown in FIGS. 6-8 to determine how visitors interact with different regions (defined using zones) in the store. For example, suppose the grocery store is split into a dairy zone (at the back of the store), a middle zone (in the center of the store, where high value items are placed), and two zones (to the left and right of the middle zone, respectively) where inexpensive items are placed. Interfaces provided by platform 170 can show how visitors interact with those zones. For example, the grocery store may be laid out the way it currently is on the assumption that most shoppers need dairy items and will take the shortest path to the dairy (i.e., go through the center of the store), passing by the high value items and placing some of those high value items into their carts. Using techniques described herein, the store layout can be assessed, e.g., with embodiments of the interfaces shown in FIGS. 6-8 indicating the concurrence between visitors to the dairy section and each of the three other sections of the store, the amount of time they spend in each region, etc.

A representative of the national retailer can also use interfaces such as those shown in FIGS. 6-8 to inform staffing and other decisions. For example, suppose that Monday visitor traffic to the Boston location typically sees the bulk of visitors staying on the first floor, with significantly fewer visitors visiting the second and third floors. Instead of staffing all three floors equally throughout the week, additional staff can be placed on the first floor on Mondays, with fewer staff being placed on the second and third floors on those days.

Figure 10:

FIG. 9 shows an interface depicting zoning information for an airport. Similar to zoning for retail spaces, zoning for airport spaces can be leveraged to view activity and duration by hour in different zones of the airport. Airport zoning includes arriving and departing zones. Platform 170 can identify what devices are arriving at the airport and what devices are departing by zone. For example, on the arrivals side, passengers typically progress from gates, passed security and/or ticketing, to baggage claim. The numbers of those individuals visiting the taxi zone vs. the limo zone vs. the rental car zone can be determined using techniques described herein. Determinations can also be made about what percentage of arriving passengers stop to shop, stop for lunch, etc., in accordance with techniques described herein, and, how long those activities take arriving passengers, on average. A departures example is depicted in FIG. 10.

Figure 11:
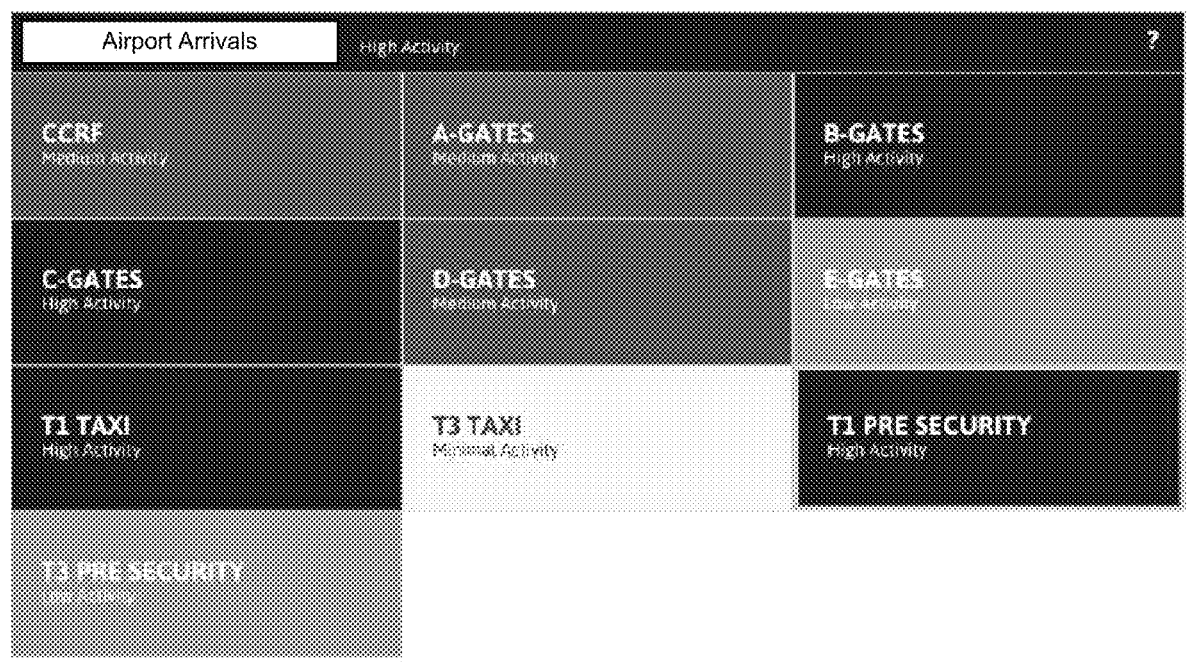

As seen in FIG. 11, activity and duration for zoning for airports, like zoning for retail, can be viewed on an hourly basis.

Figure 12:
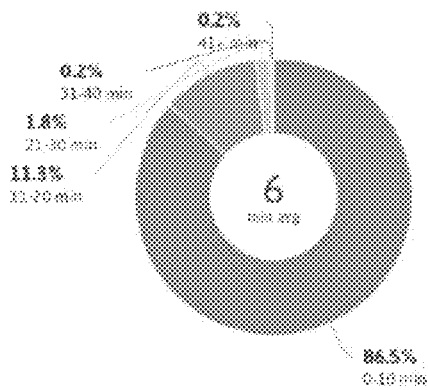

As seen in FIG. 12, security areas can be used as zones and, the activity and duration of security lines measured. The impact of the duration of time passengers spend in security lines on those passengers visiting other areas of the airport can be evaluated using techniques described herein and interfaces such as interface 1200. For example, if there is a very high spike in security wait times, passengers will probably be late for their flights, will have less time to shop/eat, and will be going straight to the gates. And, when security lines are shorter, more co-visits through the shopping/eating zones will occur. Using techniques described herein, the impact of security lines can be quantified and visualized, allowing for more informed decisions to be made (e.g., about staffing).

Taxi lines can also be analyzed (see FIG. 13).

Figure 14A:
Figure 15:

FIG. 14A shows an interface for viewing line wait times at airports. In region 1402, users can choose what time range of duration/activity data to view for different zones. In region 1404, users can set different thresholds to quickly identify if the wait times for a fifteen minute period breached the selected threshold. In region 1406, duration is reported in fifteen minute increments. In region 1408, a depiction of crowding per zone is shown. FIG. 14B shows an additional security line interface. Taxi line wait information can similarly be seen in the interface shown in FIG. 15.

Figure 16A:
FIGS. 16A and 16B show interfaces depicting zoning information for a hotel.
Figure 16B:
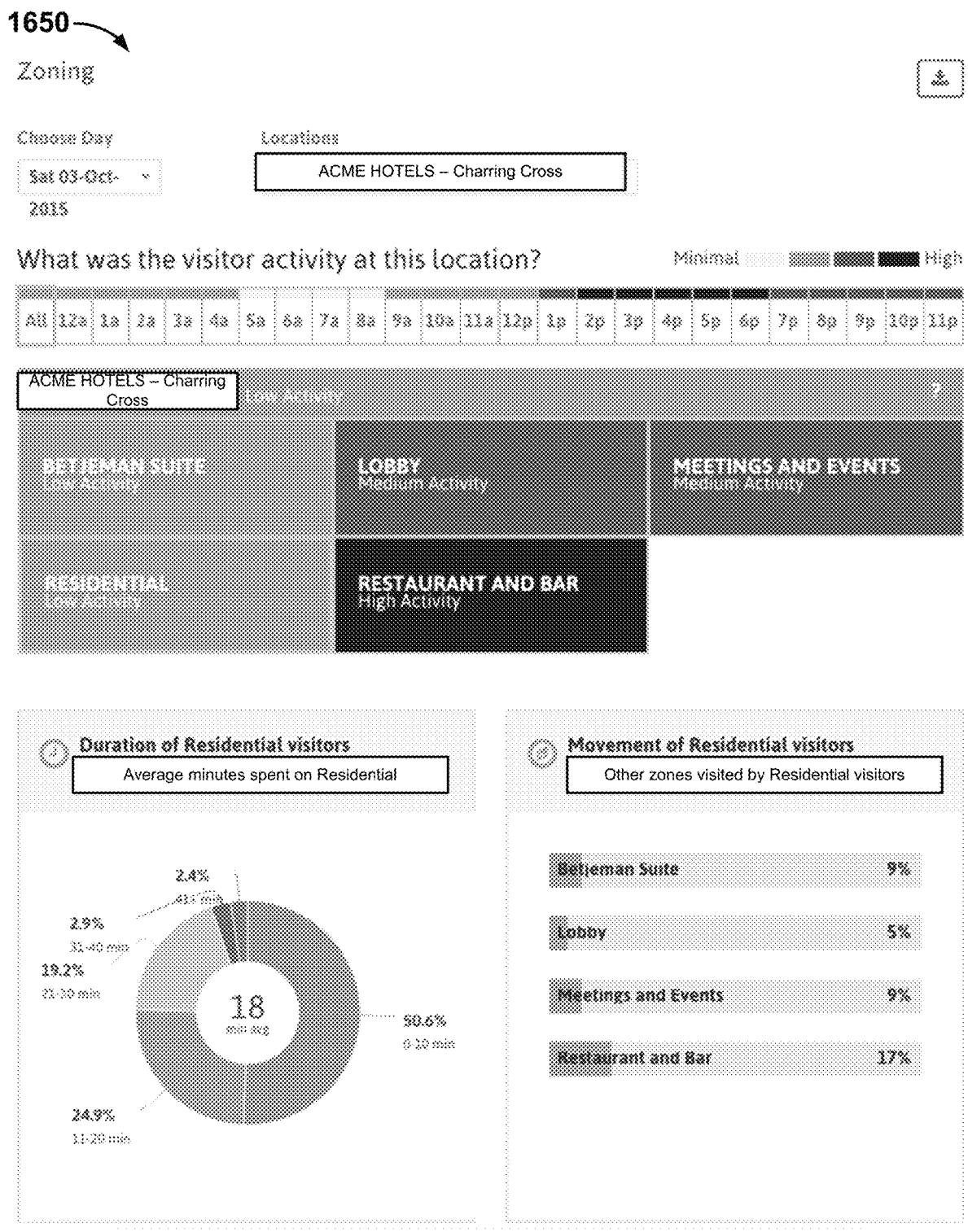

FIG. 16A shows an interface depicting zoning information for a hotel. The activity, duration, and cross visits on an hourly basis is shown in FIG. 16A for all zones in the selected hotel. FIG. 16B shows an additional hotel interface. Using techniques described herein and interfaces such as interfaces 1600 and 1650, a representative of the hotel can determine which parts of the hotel are busy and when. Further, insight such as which portion of hotel restaurant visitors are not guests of the hotel can be determined (e.g., by looking at the co-visits between the restaurant and areas of the hotel that only a guest would typically visit (e.g., the check-in area or guest rooms). As mentioned above, in some embodiments, a representative of a customer of platform 170 (e.g., an administrator acting on behalf of a hotel) configures platform 170 with a list of known employee device IDs so that they can be excluded from analysis performed by platform 170. In the context of a hotel, registering employee devices can be particularly helpful, where hotel guests and hotel employees may have significantly more similar movements/duration patterns than those between shoppers and retail clerks.

Additional Information Regarding Metrics

As explained above, platform 170 periodically (e.g., on hourly and daily intervals) computes various metrics with respect to visitor data. In some embodiments, the metrics are stored in a relational database system (RDS 242) table called "d4_metrics_tall." The metrics can also/instead be stored in other locations, such as Redshift 236. The records are used to compute metrics across various time periods per customer, zone, and device. A description of column names in "d4_metrics_tall" is provided below.

| Column Name | Use |
|---|---|
| client_name | Stores the customer name |
| hierarchy_node_id | Stores the "zone" name |
| Period | Specifies if this metric is from an hourly or daily raw log processing |
| period_earliest | The start time of the period. |
| Birth | The processing time of the period, or when the batch processing was run |
| Metric | The type of metric being calculated from the raw logs (see below) |

-continued

| Column Name | Use |
|---|---|
| Value | The calculated value of the metric |
| confidence_interval_low and confidence_interval_high | Used to specify the certainty of the calculated value of the metric |
| sample_size | The amount of data processed to calculate the value of the metric |

The following is a list of example metrics that can be computed by platform 170.

| Metric name | Description |
|---|---|
| bounce-rate | The percentage of visitors who enter the store and then leave within 2 minutes |
| capture-rate | The percentage of devices that meet the criteria for a visitor |
| engagement-rate | The percentage of visitors who enter the store and remain for at least 20 minutes |
| first-tier-dur | Visits fitting within the first tier duration |
| second-tier-dur | Visits fitting within the second tier duration |
| third-tier-dur | Visits fitting within the third tier duration |
| fourth-tier-dur | Visits fitting within the fourth tier duration |
| lapsed-30-ratio | The percentage of visitors who count as lapsed |
| recent-30-ratio | The percentage of visitors counting as recent |
| repeat-ratio | The percentage of repeat visits |
| total-opportunity | The total number of visitors during the period, used to calculate othe rmetrics |
| visit-duration | The duration of a specific visit |
| Visits | The total number of visits during a period |
| Walkbys | The percentage of recorded devices that are classified as walk-bys |

Hourly Metrics:

Every hour, platform 170 calculates metrics for each zone and customer across all data collected for the previous hour. One example hourly report is the hourly report by sensor (HRBS), which collates the customer, zone, sensor, and timestamp at which each device is seen.

Daily Metrics:

Each 24-hour period, HRBS reports are aggregated into a daily summary by span (DSBS). This report keys metrics on a combination of customer, zone, and device. For each key, the report will collect several timestamps. These include the last time a device was seen as a visitor, the last time a device was seen as a walk-by, the maximum device signal strength over the entire 24-hour period, the sum of the signal, the sum of the signal squared, the sum of the signal cubed, the event count, the inner and outer duration in seconds, and the device type. The device type includes but is not limited to visitor, walk-by, and access point.

Daily metrics are also calculated across all devices seen during that day. Using previously calculated metrics, platform 170 will then calculate a number of other statistics.

Daily metrics also include statistics covering the duration of visits. Visit length is split into distinct tiers. For example, tier 1 could be less than 5 minutes, tier 1 could be 5 to 15 minutes, and so forth. The daily metrics include which percentage of visitors fit into each tier of visit duration.

In various embodiments, aggregated daily metrics (e.g., the DSBS), are stored in RDS 242 in a table called "daily_summary_by_span". A description of various fields used as a key in "daily_summary_by_span" is provided below. Other fields in the table are used to record specific metrics and time information for specific devices in customers and zones.

| Field | Description |
|---|---|
| the_date_local | The date the record covers |
| span_name | Name of the customer |
| zone_name | Name of the zone |
| device_id | The unique ID for the measured device |
| manufacturer_id | The unique ID used to identify the manufacturer of the device |

Platform 170 also calculates long-term metrics and presents them in reports. Among these long-term reports is a 30-day report, which includes the percentage of visiting devices which have been seen in a zone more than once in the last 30 days, and, in some embodiments, the percentage of lapsed visiting devices. Lapsed devices are those which have not visited a specific zone in 30 or more days. These percentages are calculated per zone and included in a report that is prepared for each customer.

Historical data is also stored and can be queried (e.g., by historical data parsing script, function, or other appropriate element). In various embodiments, a query of historical data is performed against Redshift 236. Results are cached in S3 (212) and read by Scala code in Spark (234). Examples of metrics that can be calculated using these resources include:
- First time a device was seen in a customer's zones (across all historical data)
- Last time the device was seen as a visitor
- Last time the device was seen as a walk-by
- Maximum signal strength over the entire reporting period
- Number of sensor observations recorded during the entire reporting period for this device
- Total duration of the device's visits to the zone during the reporting period Events In various embodiments, platform 170 provides customers with the ability to designate a discrete time period as an operational event, allowing for analytics to be performed in the context of the event. An event can be an arbitrary designation of a date range (e.g., "March 2016" and can also correspond to promotional or other events (e.g., "Spring Clearance"). The following are examples of scenarios in which events might be created within platform 170:
- An analytics manager from a fast casual restaurant can enter the dates and expected revenue from a recent promotion to understand if offers/menu items drew the expected results. The analytics manager might share the information with marketing colleagues to influence future campaigns, in addition to the necessary leadership as part of a reporting exercise.
- A regional operations manager at a mid-sized specialty retailer can use an event to understand the effectiveness of a training program on his team's ability to engage customers. For example, suppose the manager has noticed a declining engagement rate month-on-month. The manager can use eventing to understand if the new educational program drew his expected engagement result and further had an impact on sales in his stores during a particular period.
- A marketing campaign manager from a national bank chain is responsible for driving new visitor traffic into the new bank-cafe hybrid locations. The locations serve coffee and tea but not food. The manager can use eventing to compare the performance of different food vendors. For example, the manager could run a campaign with a waffle company one week and then a scone vendor a few weeks later. Using eventing, the manager can leverage AB testing to select the better long-term food partner in encouraging storefront conversion and new visitor traffic.

Figure 18:
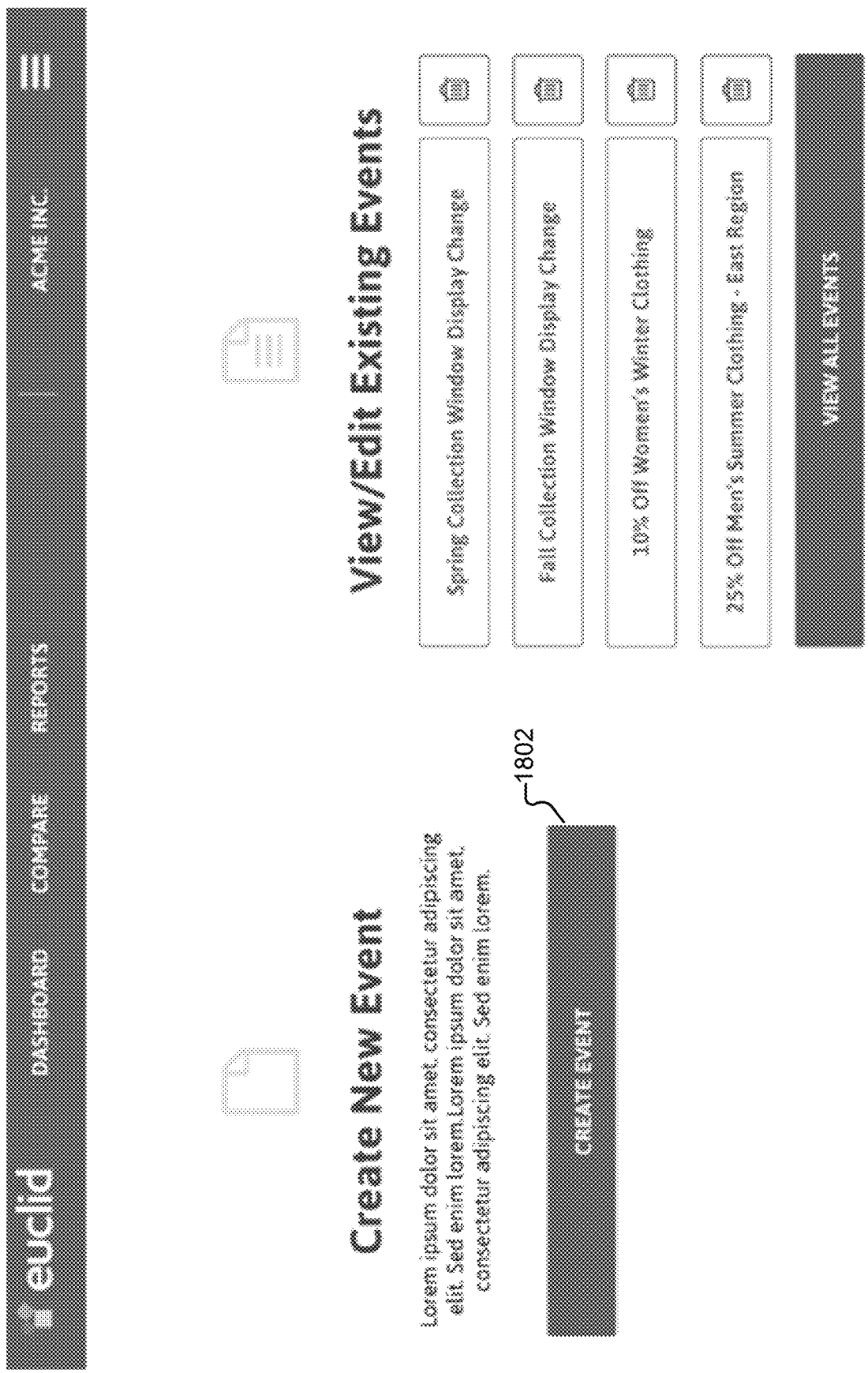
Figure 19:
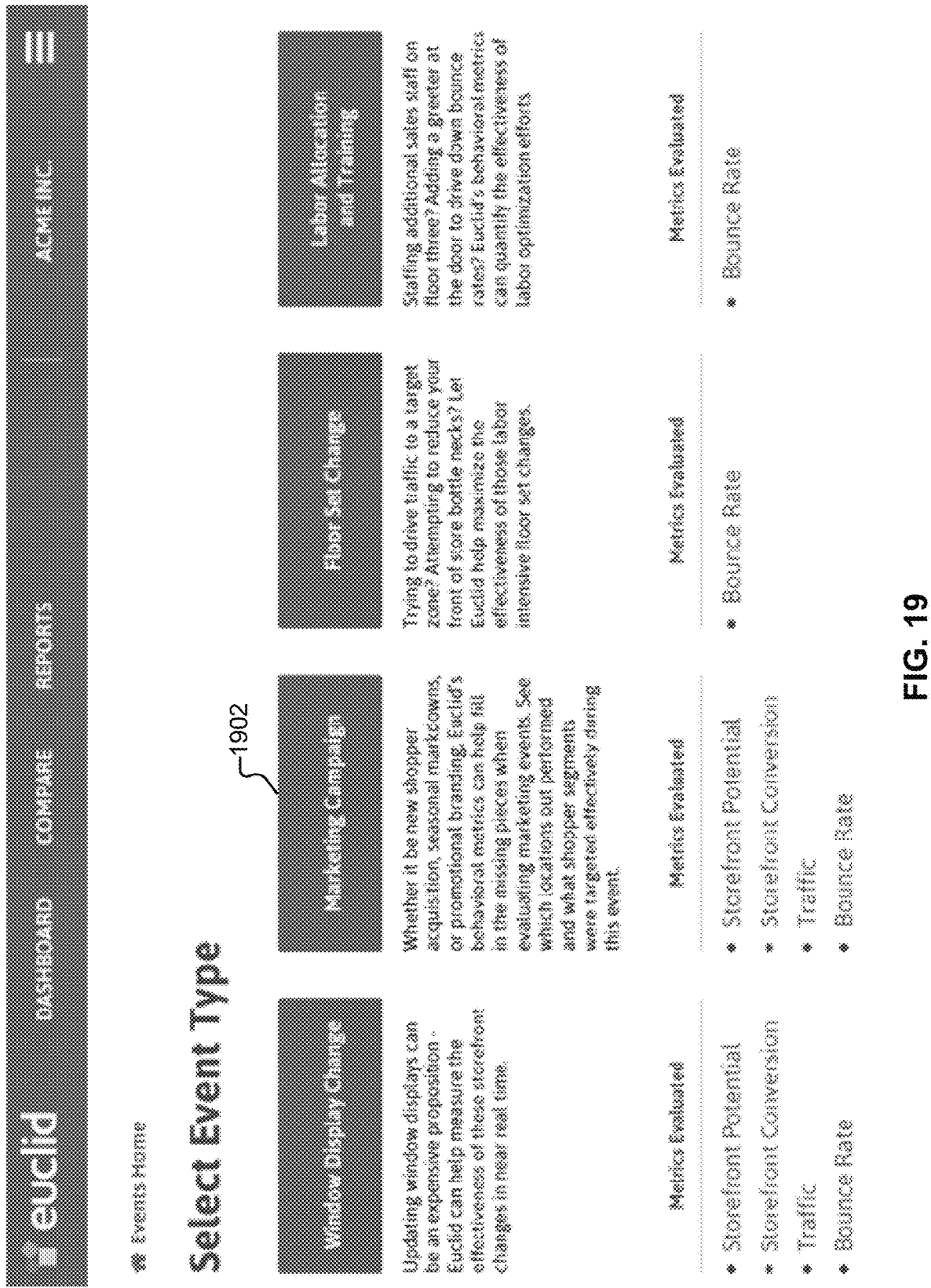

In the following example, suppose Rachel has been tasked with creating an event and evaluating visitor traffic associated with the event. A sample interface for creating an event is shown in FIG. 17 (and is an example of an interface that can be provided by platform 170, e.g., via interface 174). An alternate interface for initiating the creation of an event is shown in FIG. 18. To create a new event, Rachel clicks on region 1702 (or region 1802, as applicable). After doing so, Alice is presented with the interface shown in FIG. 19, where she is asked to pick a type of event. Suppose Alice picks "Marketing Campaign" by selecting region 1902. She is presented with the interface shown in FIG. 20 in response and prompted to supply various information with respect to event creation. Note that an event can be created retroactively. For example, Alice can create a "Winter Markdown" event for ACME on platform 170 even after the date range specified for the event has ended, allowing for retroactive analysis of data pertinent during the specified date range.

Figure 20:
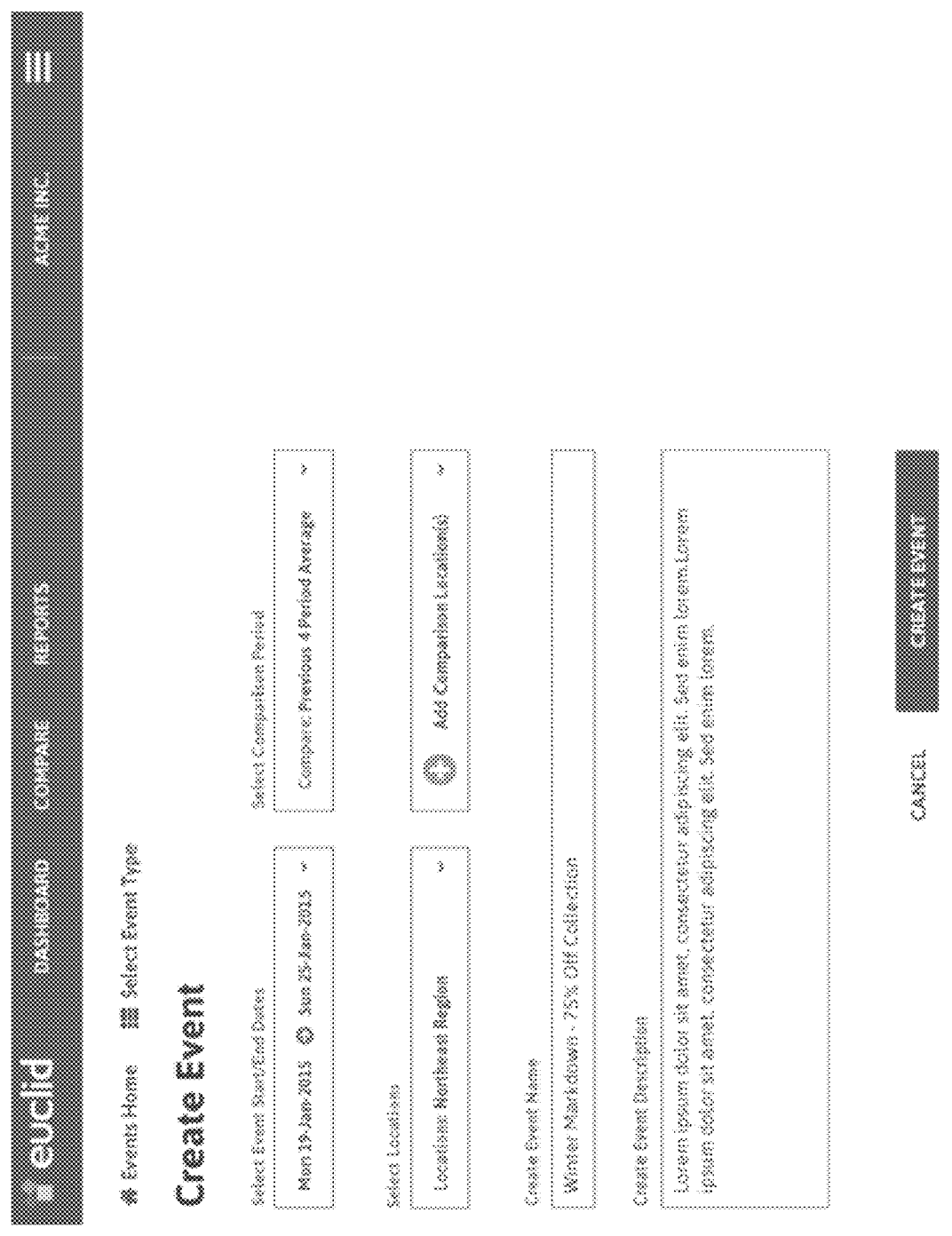

In particular, in the interface shown in FIG. 20, Alice is prompted to create an event by adding an event name, event description, location (whether an individual location or hierarchy level), date range for the event, and (optionally) expected sales for the event.

Once the event is created (and has commenced), Alice can view the performance of the event in a summary page interface, an embodiment of which is shown in FIG. 21. From the summary page interface, Alice can select specific locations, update the comparison period, edit the event, create a new event, and view upcoming events.

The summary page interface includes a metrics box 2102. In the example shown in FIG. 21, "storefront conversion" indicates how effective a location was at getting visitors into the location. "Traffic count" is count of visitors. "Bounce rate" indicates the number of visitors who left within five minutes.

Visitor Profile

Figure 22:
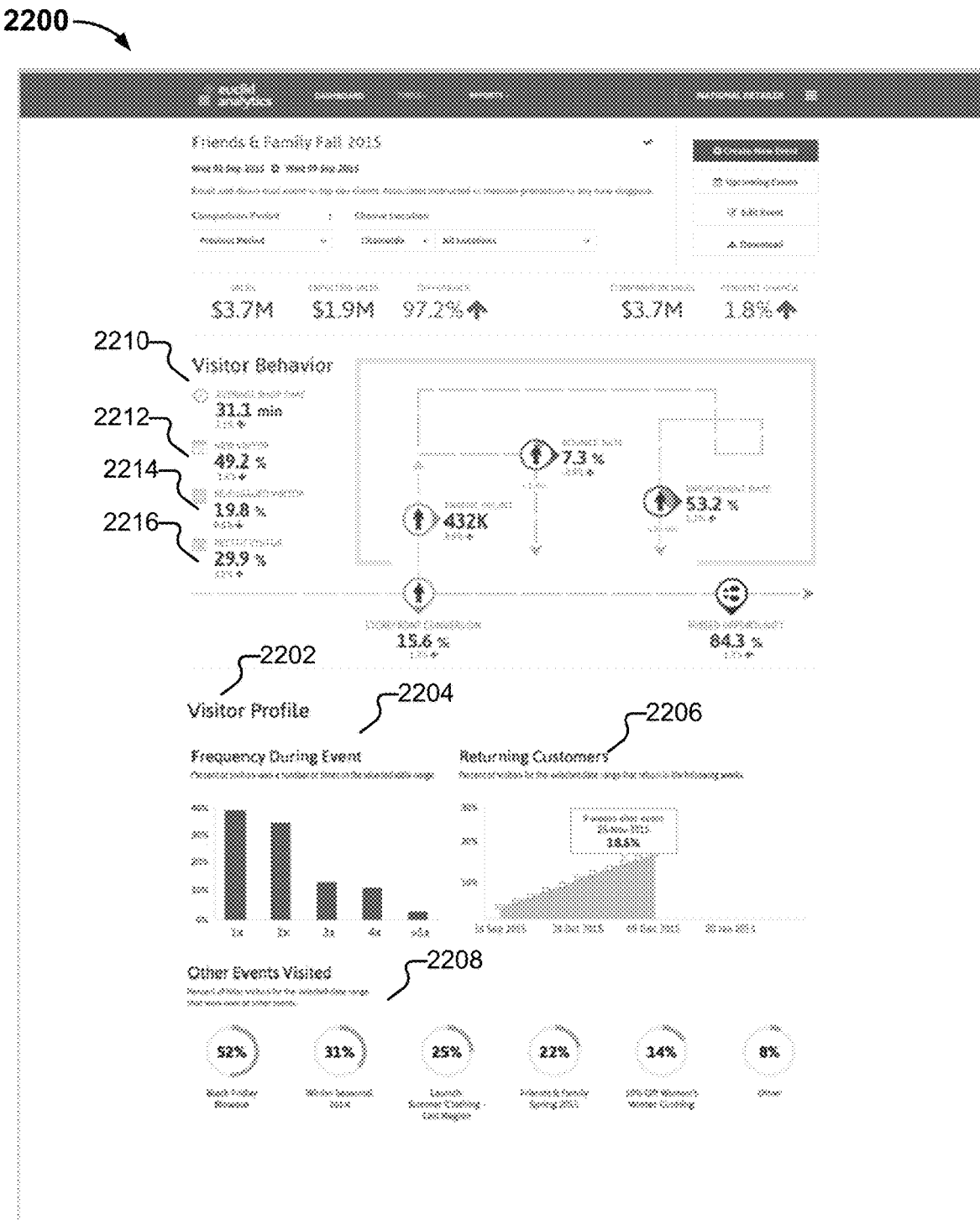

An alternate embodiment of a summary page interface is shown in FIG. 22. The summary page shown in FIG. 22 includes a visitor profile section 2202. The visitor profile provides Alice with an understanding of the type of customers entering a location during an event. In particular, the summary includes three kinds of evaluations: Frequency During Event (2204), Returning Visitors (2206), and Other Events Visited (2208). Each section provides a different view into the loyalty profile of the event visitors.

The event frequency (2204) is the ratio of visitors who are recorded at an event across distinct segments of time. For example, an event lasting three days might have event frequencies measured in 1-day increments. An event frequency report in such a scenario would indicate that a certain number of visitors were recorded during only one total day of the event, a smaller number during two separate days of the event, and an even smaller number during all three days of the event. An event frequency report can also include the total sample size or number of devices recorded during the event. In various embodiments, event frequency reports are stored in S3 or another appropriate location, allowing multiple events to be compared using multiple event frequency reports. When an event frequency report is generated (e.g., from a database), it is given a birth timestamp, which is the time at which the report was originally created. An event frequency report can also specify the beginning and end times of the event. In the example shown in FIG. 22, Alice can hover over each bar in region 2204 to see actual frequency values. Frequency metrics can also be determined outside of specific events, as applicable. For example, a fast food restaurant may choose to set an arbitrary time period (e.g., a week or a month) and measure on a recurring basis (e.g., with a histogram similar to that depicted in 2204) the number of visits made by customers in that time period.

The return rate (also referred to herein as "revisitation") of visitors after an event has concluded is depicted in region 2206. In various embodiments, event revisitation data is kept in a table in RDS 242 called "d4_event_revisitation." A returning visitors report can be run at any time after the conclusion of an event, and reports on the percentage of visitors seen during an event who have been recorded in a customer's zones for the first time since the end of the event. Percentages are reported over 24-hour periods. The maximum timespan covered by the report is determined by the lesser of two values: (1) the length of time at which 100% of visitors seen during the event have been recorded in a customer's zones since the conclusion of the event, and (2) a configurable time period that defaults to six months. Alice can hover over each point in the graph shown in region 2206 to see actual values.

Depicted in region 2208 is an indication of other events visited by visitors to the instant event (e.g., at the instant location). The report includes the percentage of visitors who were present during each event in the report compared to the total number of distinct visitors to all events in the report. One way to determine metrics on which devices have been to which (multiple) events is to tag records associated with devices the event identifiers. Another way to determine "other events visited" metrics (e.g., as shown in region 2208) is as follows. Each event at a given location has associated with it event metadata. A given event has a start date and an end date. All of the devices observed within the start/end date of a first event can then be checked to determine whether they were also observed within the start/end date of each of the other events (e.g., a comparison against the dates of the second event, a comparison against the dates of the third event, etc.). The results are ranked and the events with the highest amount of overlapping observed devices are presented in region 2208.

The following are examples of scenarios in which data in the visitor profile is used by a representative of a customer of platform 170:

The analytics manager from the fast casual restaurant can use the visitor profile to understand if a recent menu promotion encouraged repeat visits during the allotted time that the promotion ran. With that information, the manager can start to compare events and opt to plan future promotions based on the stickiness of past ones.

Suppose the regional operations manager at the mid-sized specialty retailer has rolled out a new training to his staff in which they create closer relationships with customers and sometimes seek their contact information for follow-up. The manager can use the visitor profile to see if this tactic is effective at encouraging an increase in repeat visitors over time, signaling that loyalty is being nurtured by his staff.

Suppose a marketing campaign manager for a national pet food/supplies chain has been urging management to pull back from doing discount-driven promotions, as she suspects that such promotions do not attract valuable customers for the chain. The manager could test two promotions: one that is discount-driven (e.g., 20% off all pet bedding) and one that is not (e.g., "check out our new indestructible chew toys"). With the discount-driven promotion, she will be able to tell if the overlap with other events confirms her suspicion about a customer segment that only visits during discounts. Furthermore, she might be able to tell which promotion encourages more repeat visits after the conclusion of the event.

Visitor Loyalty Behavior

Also included in interface 2200 is region 2210, which indicates visitor loyalty behavior. In particular, region 2210 reports on the percentage of customers who are new (2212), re-engaged (2214), or recent (2216). In addition to the current breakdown of visitor types (49.2% new; 19.8% re-engaged; 29.9% recent), a comparison between the current breakdown and a previous time period (e.g., a previous event) is included (i.e., −3.6%; −0.5%; 3.2%).

A new visitor is one who has not been seen previously (e.g., at the reporting location, or at any location, as applicable). A visitor will remain classified as new until he returns to a previously visited location. A re-engaged visitor is one who has visited the same location at least twice, and whose last visit to that location was more than 30 days ago. In various embodiments, 30 days is used as a default threshold value. The value is customizable. For example, certain types of businesses (e.g., oil change facilities) may choose to use a longer duration (e.g. 60 or 90 days) to better align with their natural customer cycle, whereas other businesses (e.g., coffee shops) may choose to use a shorter duration (e.g., 14 days). A recent visitor is one has visited the same location at least twice, and whose previous visit was within the last 30 days.

Figure 23:
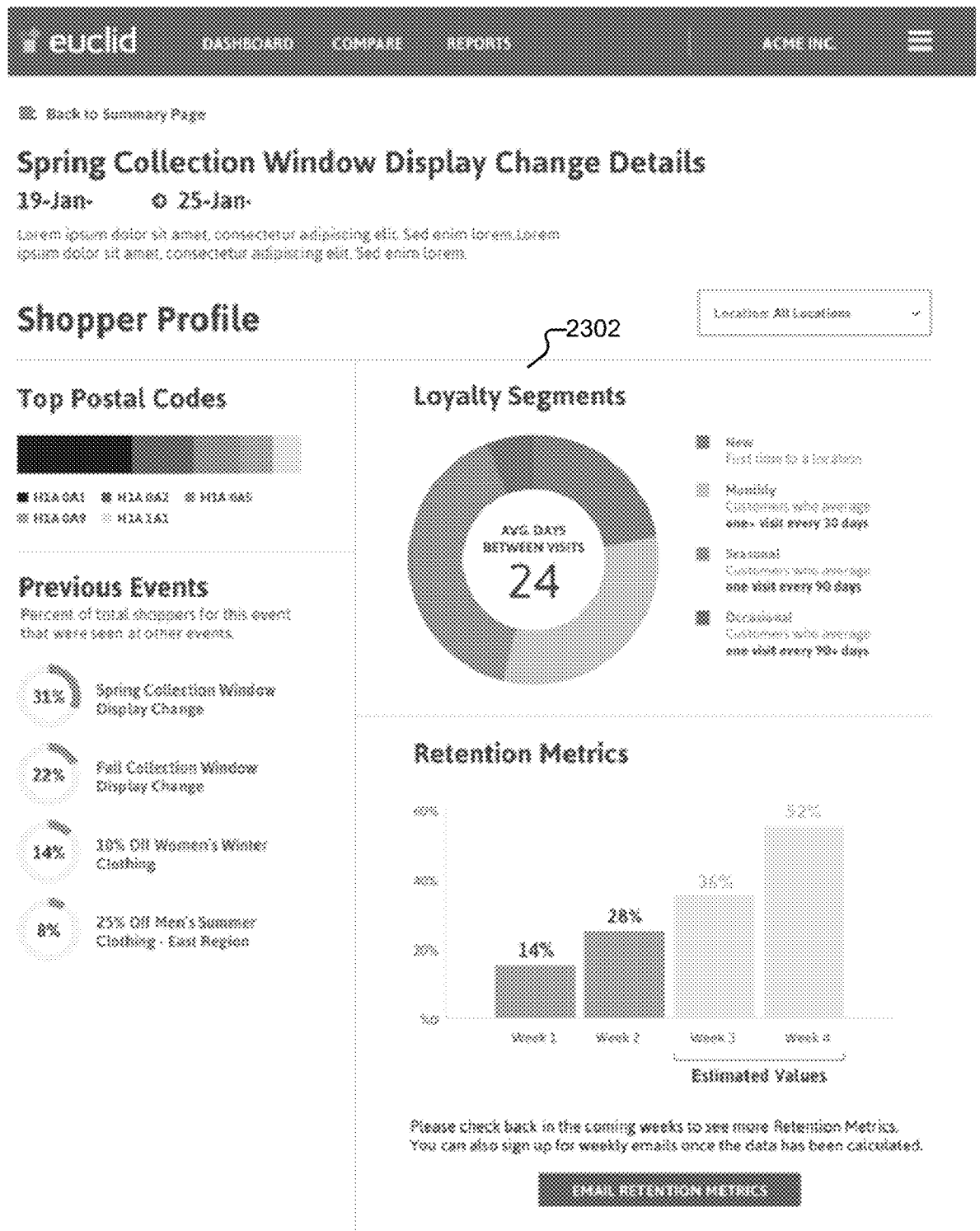
FIG. 23 shows an example of an interface depicting loyalty information.

An alternate embodiment of an interface depicting loyalty information is shown in FIG. 23 (in region 2302).

The following are examples of scenarios in which a user of platform 170 is interested in the ability to differentiate between kinds of visitor loyalty behavior:

Sean is responsible for regional merchandising for a national retail chain for teens. He currently plans for a large shipment every 30 days. Knowing that his more loyal customers visit that frequently, he configures the chain's account with platform 170 such that a "recent" shopper is one who visits every 30 days. Using the "re-engaged" metric, Sean will be able to see if a certain month's merchandise is more effective at bringing in customers who may be slipping away. Similarly, should he choose to push the merchandise with an in-store event or advertising, he may be able to observe whether the additional marketing spend increased the "re-engaged" metric with the end goal of moving "re-engaged" customers into the "recent" bucket.

Figure 24:
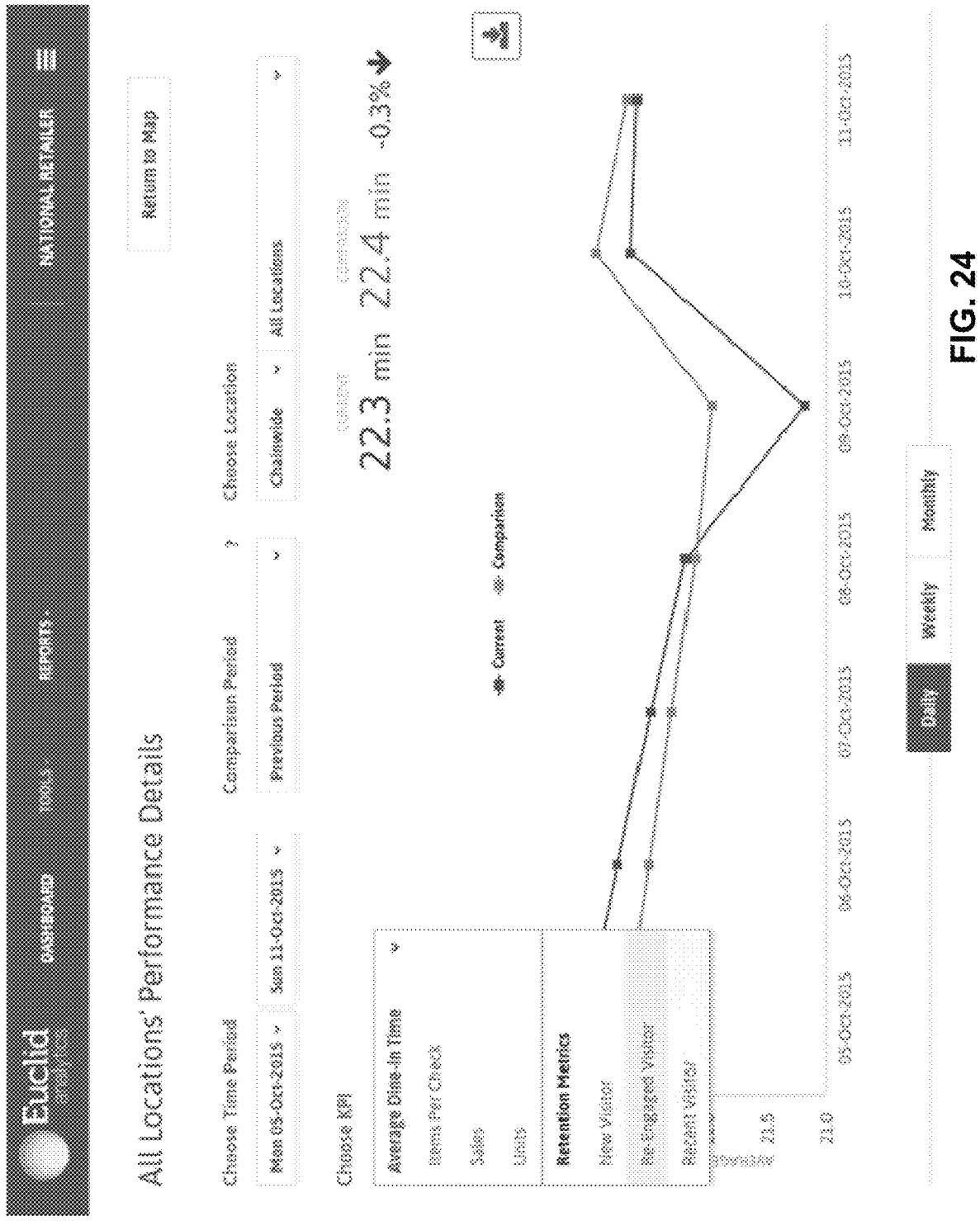
FIG. 24 shows an example of an interface in which a comparison between two periods' re-engagement is displayed.

Jenn manages marketing campaigns for a regional coffee and tea chain. She knows that her Fall menu typically drives increased traffic into the locations, particularly from non-regular customers. This year, she would like to see if she can bring those less loyal customers in before the seasonal items are introduced, and also see if she can keep them longer. One option she has is to start promotion early and track the success through the "re-engaged." Once the Fall menu is formally introduced she can compare the subsequent "re-engaged" metric to the one observed after her early promotion kicks off. An example of performing a comparison between two periods' re-engaged metrics is shown in FIG. 24. Over the course of the Fall season, Jenn can also track the "new" visitor number closely (e.g., to ensure it has decreased steadily but not too much).

Figure 25:
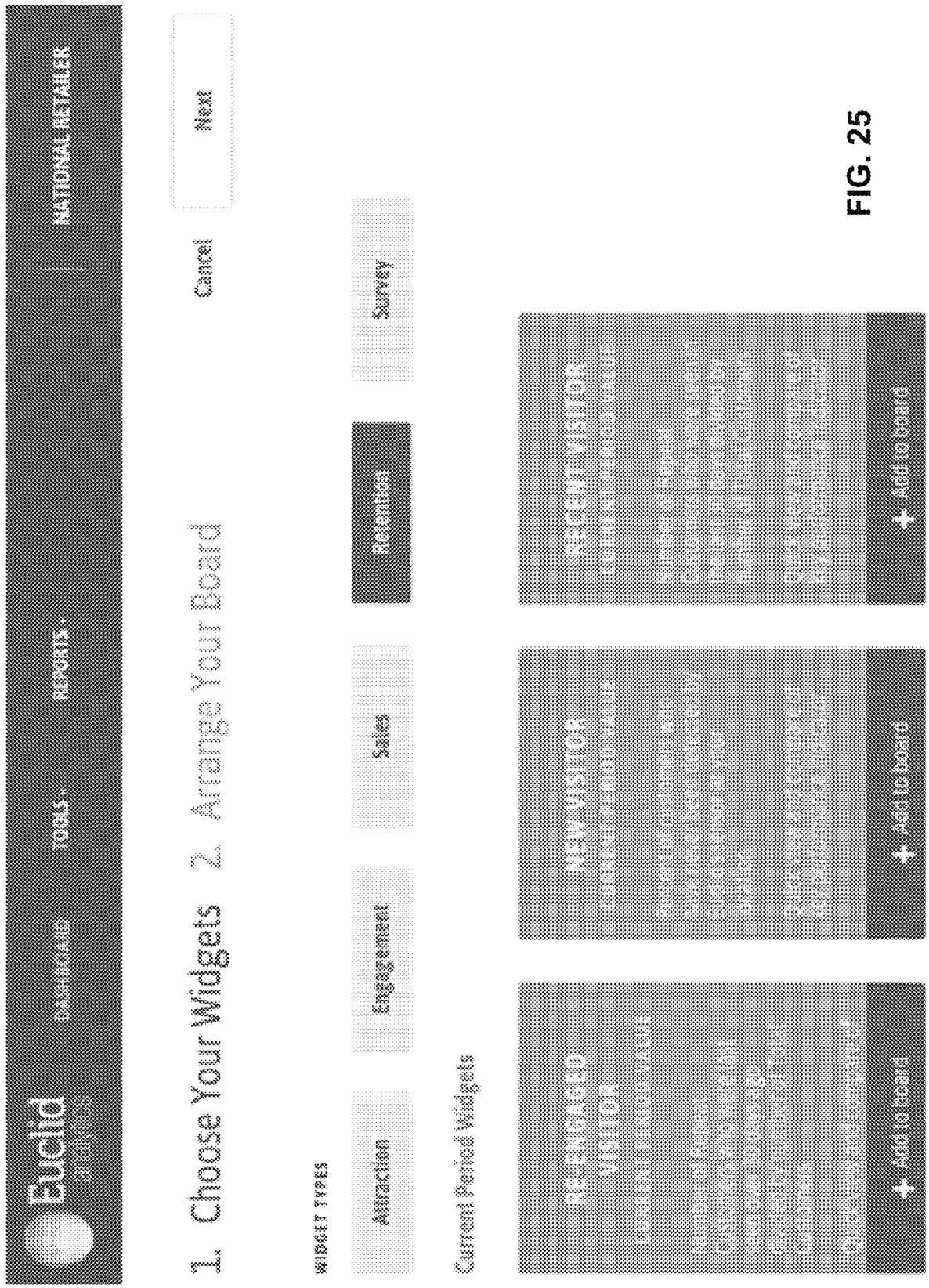
FIG. 25 shows an example of an interface in which options for including visitor loyalty data in a dashboard view is displayed.

In various embodiments, the interface provided to a user of platform 170 is configurable by that user. For example, a user can indicate which widgets should be presented to the user in a dashboard view. In the interface shown in FIG. 25, the user is reviewing options for including visitor loyalty data in the dashboard view.

Figure 26:
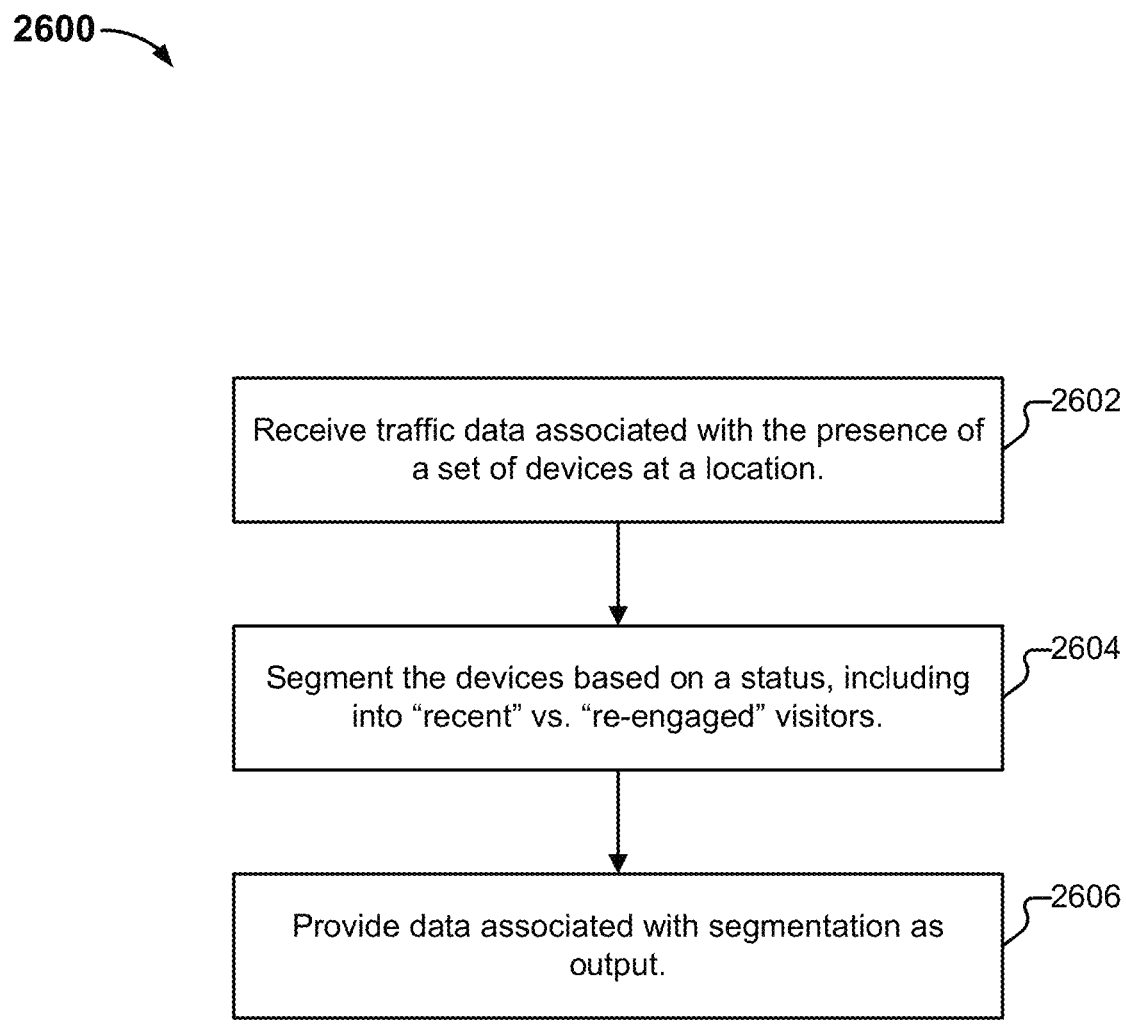
FIG. 26 illustrates an embodiment of a process for assessing visitor composition.

FIG. 26 illustrates an embodiment of a process for assessing visitor composition. In various embodiments, process 2600 is performed by platform 170. The process begins at 2602 when traffic data associated with the presence of a set of devices at a location is received. As one example, such traffic data is received at 2602 when a sensor, such as sensor 108 transmits log data (e.g., indicating that it has observed device 110) to platform 170 via one or more networks (collectively depicted in FIG. 1A as Internet cloud 102), and that data is provided (e.g., by ELB 204) to an ingestor (e.g., ingestor 206). Portion 2602 of the process may be repeated several times (e.g., with data about the observation of device 112 also being received at 2602, whether from sensor 108, or another sensor, and/or from a controller). At 2604, the devices are segmented based on a status. Examples of device status include (for a given location) whether the device is "new," "re-engaged," or "recent." In various embodiments, segmentation is performed by metrics pipeline 230 (described in more detail above) evaluating log data (e.g., in storage 212, RDS 242, Redshift 236, and/or Cassandra 228) as applicable and annotating the log data in accordance with rules such as those provided above (i.e., using the definitions of new/re-engaged/recent visitors). At 2606, data associated with the segmentation is provided as output. As one example, a breakdown of visitor composition is depicted (e.g., at 2606) in the interface shown in FIG. 22 in region 2210. As shown in FIG. 22, the view presented in interface 2200 is dynamic, and portion 2606 can be repeated (e.g., in response to user interactions with interface 2200).

Events Pipeline Wrapper

Events pipeline wrapper 240 (eventsPipelineWrapper.py) is a Python script that calculates events-based metrics in various embodiments. In particular, events pipeline wrapper 240 outputs the following: (1) event frequency; (2) revisitation; and (3) overlap. FIGS. 27-30 collectively depict an example implementation of an events pipeline wrapper script.

In various embodiments, an RDS table called "d4_event_frequency" (keyed by customer, zone, an event identifier, and start/end times) is includes the following fields:

| Field | Description |
| --- | --- |
| client_name | The customer name |
| hierarchy_node_id | The zone name |
| start_date | The beginning of the event |
| end_date | The end of the event |
| Birth | The time at which the metric was calculated |
| Metric | The metric calculated (visitor-frequency) |
| frequency_level | The number of days for which visitor frequency was calculated |
| Value | The count of distinct visitors detected by the zone's sensors for the number of days in the "frequency_level" column |
| sample_size | The total number of visitors detected by the zone's sensors over the entire duration of the event. |

Figure 31:
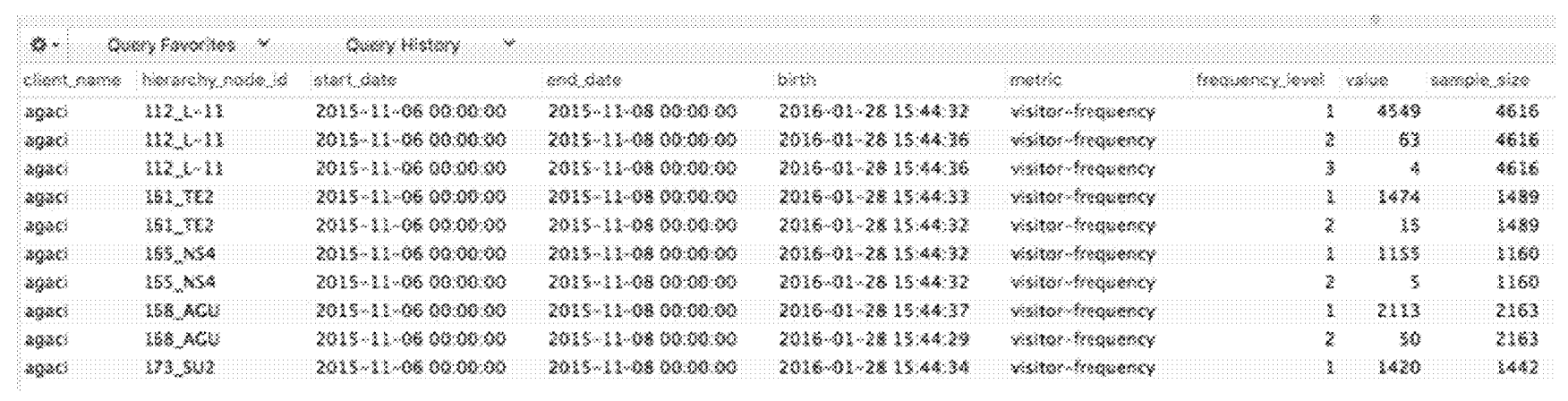

Sample data from the "d4_event_frequency" table is shown in FIG. 31. In the example of FIG. 31, a three day event was held. A total of 4616 unique devices were seen at sensor 112_L-11 during the three day event. Of those devices, 4549 visited once, 63 visited two of the three days, and 4 visited all three days. A total of 1489 unique devices were seen at sensor 161_TE2. Of those devices, 1474 visited once, 15 visited two of the three days, and no devices visited all three days.

Figure 32:
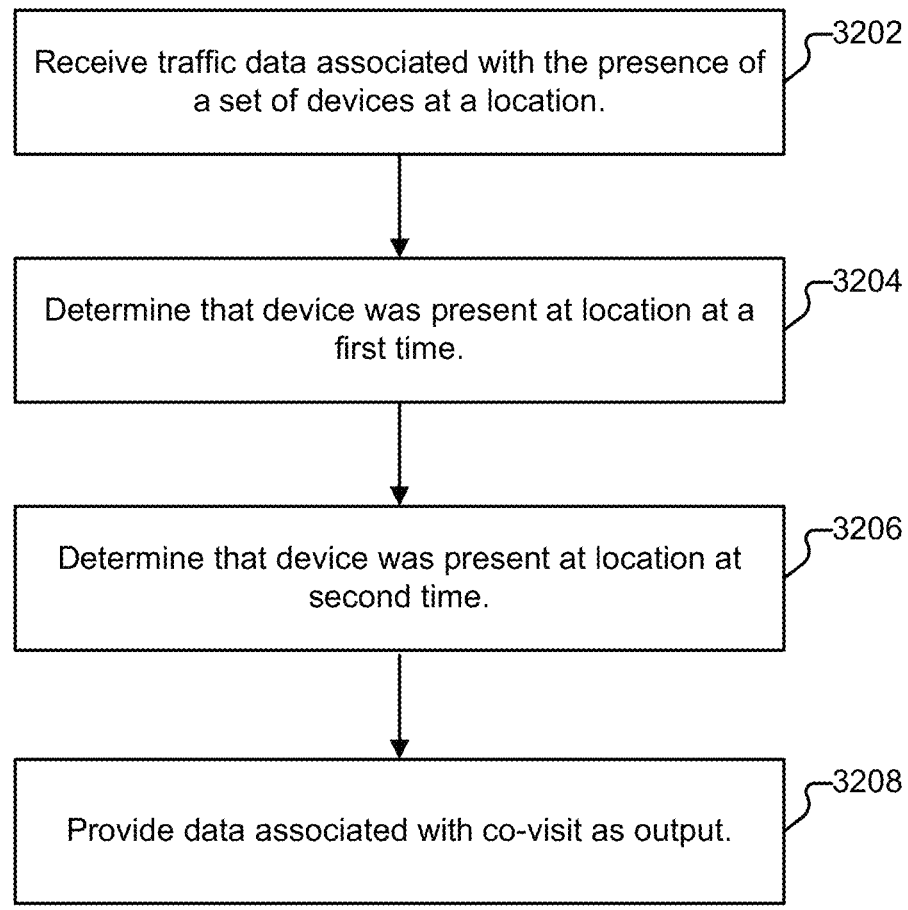
FIG. 32 illustrates an embodiment of a process for determining co-visits by visitors.

FIG. 32 illustrates an embodiment of a process for determining co-visits by visitors. In various embodiments, process 3200 is performed by platform 170. The process begins at 3202 when traffic data associated with the presence of a set of devices at a location is received. As one example, such traffic data is received at 3202 when a sensor, such as sensor 108 transmits log data (e.g., indicating that it has observed device 110) to platform 170 via one or more networks (collectively depicted in FIG. 1A as Internet cloud 102), and that data is provided (e.g., by ELB 204) to an ingestor (e.g., ingestor 206). Portion 3202 of the process may be repeated several times (e.g., with data about the observation of device 112 also being received at 3202, whether from sensor 108, or another sensor, and/or from a controller). At 3204, a determination is made that a first device was present at a first location at a first time (e.g., during an event). In various embodiments, the determination is made by events pipeline wrapper 240. At 3206, a determination is made that the device was also present at the first location at a second time (e.g., during a subsequent event). In various embodiments, the determination is also made by events pipeline wrapper 240. In various embodiments, portions 3204 and/or 3206 of process 3200 are performed by metrics pipeline 230 (described in more detail above) evaluating log data (e.g., in storage 212, RDS 242, Redshift 236, and/or Cassandra 228) as applicable and annotating the log data. Finally, at 3208, data associated with the co-visit (of the device to the first location on two different occasions) is provided as output. As one example, a breakdown of visitor co-visits is depicted (e.g., at 2608) in the interface shown in FIG. 22 in region 2202. Additional discussion of aspects of process 3200 are provided above (e.g., in conjunction with discussion of FIG. 22).

Figure 33:
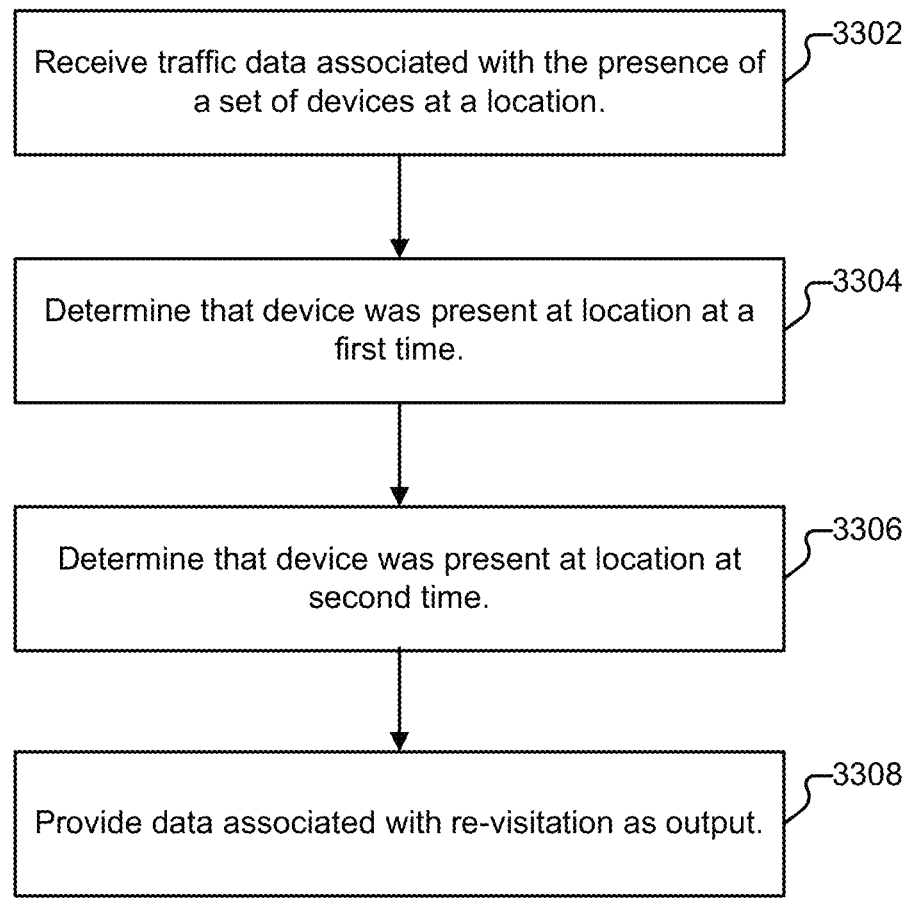
FIG. 33 illustrates an embodiment of a process for determining re-visitation by visitors.

FIG. 33 illustrates an embodiment of a process for determining re-visitation by visitors. In various embodiments, process 3300 is performed by platform 170. The process begins at 3302 when traffic data associated with the presence of a set of devices at a location is received. As one example, such traffic data is received at 3302 when a sensor, such as sensor 108 transmits log data (e.g., indicating that it has observed device 110) to platform 170 via one or more networks (collectively depicted in FIG. 1A as Internet cloud 102), and that data is provided (e.g., by ELB 204) to an ingestor (e.g., ingestor 206). Portion 3302 of the process may be repeated several times (e.g., with data about the observation of device 112 also being received at 3302, whether from sensor 108, or another sensor, and/or from a controller). At 3304, a determination is made that a first device was present at a first location at a first time (e.g., during an event). In various embodiments, the determination is made by events pipeline wrapper 240. At 3306, a determination is made that the device was also present at the first location at a second time (e.g., at a time subsequent to the event). In various embodiments, the determination is also made by events pipeline wrapper 240. In various embodiments, portions 3304 and/or 3306 of process 3300 are performed by metrics pipeline 230 (described in more detail above) evaluating log data (e.g., in storage 212, RDS 242, Redshift 236, and/or Cassandra 228) as applicable and annotating the log data. Finally, at 3308, data associated with the re-visit (of the device to the first location at a subsequent time) is provided as output. As one example, a breakdown of the lengths of time it took for visitors to re-visit is depicted (e.g., at 2606) in the interface shown in FIG. 22 in region 2202. Additional discussion of aspects of process 3300 are provided above (e.g., in conjunction with discussion of FIG. 22).

Figure 34:
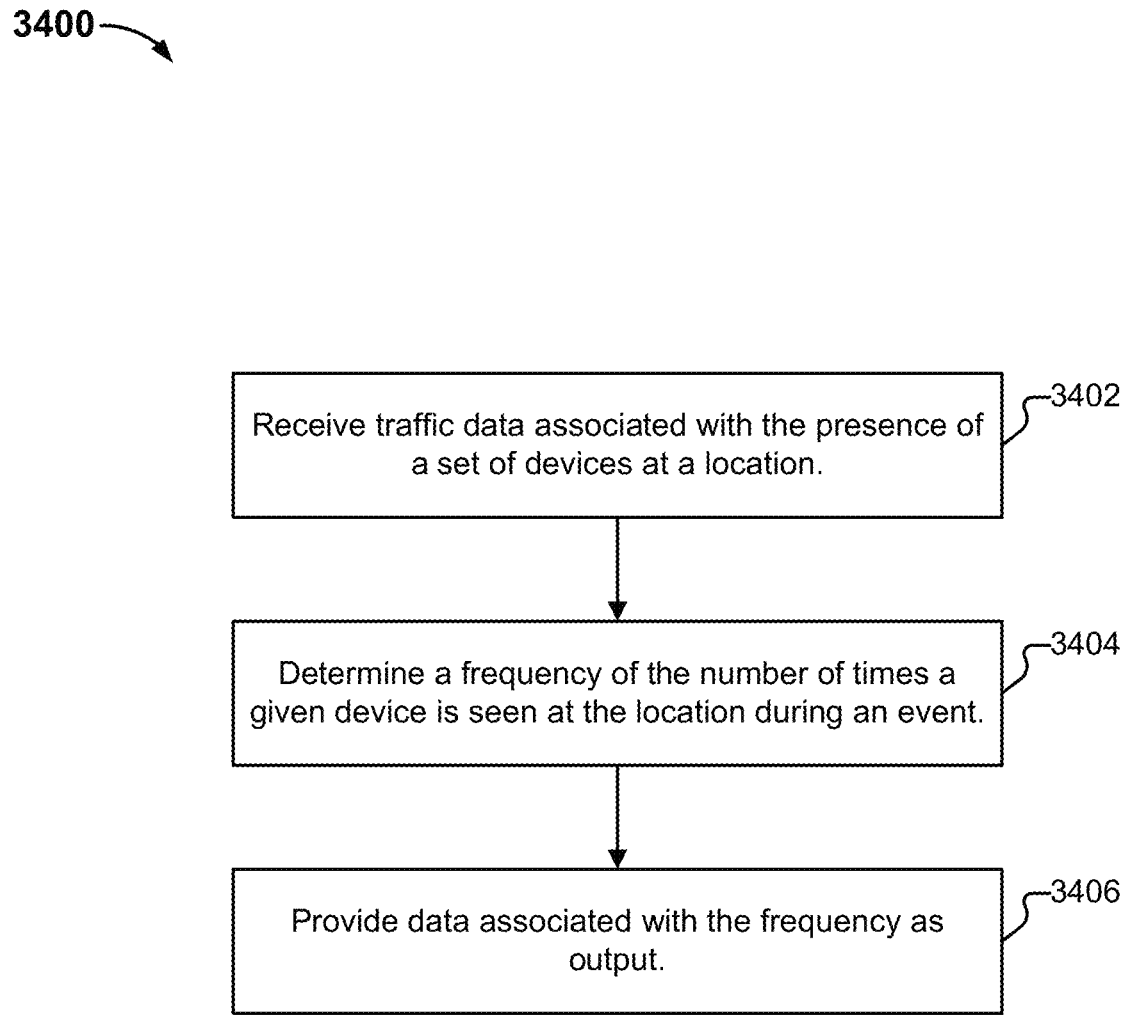
FIG. 34 illustrates an embodiment of a process for assessing visitor frequency during an event.

FIG. 34 illustrates an embodiment of a process for assessing visitor frequency during an event. In various embodiments, process 3400 is performed by platform 170. The process begins at 3402 when traffic data associated with the presence of a set of devices at a location is received. As one example, such traffic data is received at 3402 when a sensor, such as sensor 108 transmits log data (e.g., indicating that it has observed device 110) to platform 170 via one or more networks (collectively depicted in FIG. 1A as Internet cloud 102), and that data is provided (e.g., by ELB 204) to an ingestor (e.g., ingestor 206). Portion 3402 of the process may be repeated several times (e.g., with data about the observation of device 112 also being received at 3402, whether from sensor 108, or another sensor, and/or from a controller). At 3404, a determination is made of the frequency of the number of times that a given device was observed at the location. In various embodiments, the frequency analysis is performed by events pipeline wrapper 240. In various embodiments, the frequency analysis is performed by metrics pipeline 230 (described in more detail above) evaluating log data (e.g., in storage 212, RDS 242, Redshift 236, and/or Cassandra 228) as applicable and annotating the log data. At 3406, data associated with the frequency is provided as output. As one example, a breakdown of visitor frequency is depicted (e.g., at 3406) in the interface shown in FIG. 22 in region 2204. Additional discussion of aspects of process 3400 are provided above (e.g., in conjunction with discussion of FIG. 22).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive traffic data associated with the physical presence of a set of devices at a physical location,
wherein the received traffic data includes log data associated with the physical presence of the set of devices received from a sensor at a zone associated with the physical location;
based at least in part on at least a portion of the traffic data, determine a duration of time that a given device included in the set of devices has been physically present at the physical location;
classify at least some of the devices included in the set of devices as qualified devices when the determined duration of time that the given device has been physically present at the physical location is between a threshold minimum amount of time and a threshold maximum amount of time;
create a set of sessions associated with at least some of the qualified devices upon determining a device-zone-duration 3-tuple for the given device of the set of devices satisfies creation of the set of sessions; and
provide as output information associated with the created set of sessions, including a set of metrics associated with a duration and a physical location of at least some of the qualified devices and a wait time for the given device at the physical location; and a memory coupled to the processor and configured to provide the processor with instructions.

2. The system of claim 1 wherein the processor is further configured to remove at least one unqualified device from the set of devices.

3. The system of claim 1 wherein the processor is further configured to mark an unqualified device as banned.

4. The system of claim 1 wherein the processor is configured to qualify at least some of the devices by determining a likelihood a given device belongs to an employee.

5. The system of claim 1 wherein the processor is configured to qualify at least some of the devices by determining a likelihood a given device is computing equipment not carried by an individual.

6. The system of claim 1 wherein the qualifying is performed based at least in part on a pre-existing list of devices.

7. The system of claim 1 wherein the qualifying is performed based at least in part on an examination of features associated with the traffic data received from the sensor.

8. The system of claim 1 wherein classifying at least some of the devices included in the set of devices as qualified devices includes using a decision tree to classify devices as qualified devices.

9. The system of claim 1 wherein classifying at least some, of the devices included in the set of devices as qualified devices includes qualifying devices based on a combination of the determined duration of time for the devices and a received signal strength it indicator (RSSI) for the devices.

10. The system of claim 1 wherein the minimum amount of time threshold is 30 seconds.

11. The system of claim 1 wherein the maximum amount of time threshold is 5 hours.

12. The system of claim 1 wherein the processor is further configured to add the given device included in the set of devices to a blacklist of devices based at least in part on a determination that the given device was observed for a duration that exceeds the threshold.

13. The system of claim 1 wherein creating the set of sessions includes determining a mapping between a sensor and the zone associated with the physical location.

14. A method performed by a traffic insight platform associated with an entity, the method comprising:
receiving traffic data associated with a physical presence of a set of devices at a physical location from a sensor at a zone associated with the physical location;
determining a duration of time that a given device included in the set of devices has been physically present at the physical location using the received traffic data;
classifying the given device as a qualified device when the determined duration of time that the given device has been physically present at the physical location is between a threshold minimum amount of time and a threshold maximum amount of time;
creating a set of sessions associated with the given device, wherein each session of the set of sessions satisfies a device-zone-duration 3-tuple for the given device;
storing data associated with the set of sessions in a database of the traffic insight platform; and
providing as output information associated with the created set of sessions, including a set of metrics associated with a duration and a physical location of at least some of the set of devices and a wait time for the given device at the physical location.

15. The method of claim 14, wherein the device-zone-duration 3-tuple maps information identifying the given device to information identifying the zone associated with the physical location to information identifying a duration of the given device within the zone.

16. The method of claim 14, wherein the entity is associated with a building, and wherein the zone is a floor of the building.

17. A non-transitory, computer-readable medium whose contents, when executed by a traffic insight platform associated with an entity, cause the traffic insight platform to perform a method, the method comprising:
receiving traffic data associated with a physical presence of a set of devices at a physical location from a sensor at a zone associated with the physical location;
determining a duration of time that a given device included in the set of devices has been physically present at the physical location using the received traffic data;
classifying the given device as a qualified device when the determined duration of time that the given device has been physically present at the physical location is between a threshold minimum amount of time and a threshold maximum amount of time;
creating a set of sessions associated with the given device, wherein each session of the set of sessions satisfies a device-zone-duration 3-tuple for the given device; and
providing as output information associated with the created set of sessions, including a set of metrics associated with a duration and a physical location of at least some of the set of devices and a wait time for the given device at the physical location.

* * * * *